United States Patent Office 3,374,417
Patented Mar. 19, 1968

3,374,417
VOLTAGE CONTROLLING SYSTEM
FOR ELECTRIC GENERATOR
David L. Trower, Affton, Mo., assignor to Century Electric Company, St. Louis, Mo., a corporation of Missouri
Filed Apr. 26, 1965, Ser. No. 450,772
18 Claims. (Cl. 322—28)

ABSTRACT OF THE DISCLOSURE

A combination exciter and regulator for an alternating current generator utilizes the residual magnetism of that generator to build up the excitation for that generator to the poin where that excitation can mainain the output voltage of that generator at the desired level; and, thereafter, that combination exciter and regulator will permit a drop in the speed of the prime mover for that generator to reduce the output voltage of that generator—and thus the load on that prime mover—so that prime mover can increase its speed to its normal value. In addition, that combination exciter and regulator has an amplifying sub-circuit which enables small changes in the value of the output voltage of that generator to provide relatively large changes in the current flowing through the field winding of that generator, and thereby hold that output voltage close to its desired level.

---

This invention relates to improvements in Control Systems. More particularly, this invention relates to improvements in control systems for alternating current generators.

It is, therefore, an object of the present invention to provide an improved control system for alternating current generators.

It is customary, in the operation of alternating current generators, to provide exciters which excite the field windings of those generators. Further, in the operation of alternating current generators, it is customary to provide regulators which regulate the output voltages of those generators. The cost of a regulator for an alternating current generator, which is separate from and which is in addition to the exciter for the field winding of the generator, can unduly increase the overall cost of the generator; and hence it would be desirable to provide a combination exciter and regulator for an alternating current generator. The present invention provides such a combination exciter and regulator; and it is, therefore, an object of the present invention to provide a combination exciter and regulator for an alternating current generator.

The combination exciter and regulator provided by the present invention utilizes the residual magnetism of the generator, with which it is used, to build up the excitation of that generator to the point where that excitation can maintain the output voltage of that generator at the desired level. In doing so, that combination exciter and regulator obviates all need of an external source of electrical energy for starting or operating that generator. It is, therefore, an object of the present invention to provide a combination exciter and regulator which utilizes the residual magnetism of the generator, with which it is used, to build up the excitation of that generator to the point where that excitation can maintain the output voltage of that generator at the desired level.

The rotors of generators are frequently driven by prime movers; and some of those prime movers have the speeds thereof regulated by mechanical governors. While a mechanical governor can maintain the speed of the prime mover, and hence the speed of the rotor of the generator driven thereby, within acceptable limtis as long as the load on that generator is substantially constant, the speed of that prime mover and the speed of that rotor will tend to vary beyond those limits whenever the load changes abruptly and substantially. Thus, whenever full load is suddenly applied to a generator, the mechanical governor for the prime mover will usually be unable to keep the speed of the prime mover and the speed of the rotor from falling below the lower acceptable limit. Conversely, whenever the greatest part of the load is suddenly disconnected from the generator, the mechanical governor for the prime mover will usually be unable to keep the speed of the prime mover and the speed of the rotor from rising above the upper acceptable limit. Such falls and rises in the speed of the prime mover and rotor are undesirable; and, as a result, it would be desirable to provide a combination exciter and regulator which could be used with a generator, that had a mechanical governor regulating the speed of the prime mover and the speed of the rotor of the generator, and which could minimize the effect that changes in the load on that generator would have on the speed of the rotor of that generator. The present invention provides such a combination exciter and regulator; and it is, therefore, an object of the present invention to provide a combination exciter and regulator which can be used with a generator and which can minimize the effect that changes in the load on that generator have on the speed of the rotor of that generator.

The combination exciter and regulator provided by the present invention minimizes the effect that changes in the load on a generator can have on the speed of the rotor of that generator by responding to changes in that speed to permit the output voltage of that generator, and hence the load on the prime mover, to change in such a way that the speed of the prime mover will quickly return to its normal value. Specifically, the combination exciters and regulator provided by the present invention permits a drop in the speed of the prime mover, and hence in the speed of the rotor of the generator, to reduce the output voltage of that generator; and that reduction in output voltage will reduce the load on that prime mover, and thereby enable that prime mover to increase its speed to its normal value. Conversely, that combination exciter and regulator permits an increase in the speed of the prime mover, and hence in the speed of the rotor of the generator, to increase the output voltage of that generator; and that increase in output voltage will increase the load on that prime mover, and thereby force that prime mover to decrease its speed to its normal value. The overall result is that the speed of the generator rotor, and hence the frequency of the output voltage, will be held within acceptable limits. It is, therefore, an object of the present invention to provide a combination exciter and regulator that permits a drop in the speed of the prime mover, and hence in the speed of the rotor of the generator, to reduce the output voltage of that generator, and that permits an increase in the speed of the prime mover, and hence in the speed of the rotor of the generator, to increase the output voltage of that generator.

The combination exciter and regulator provided by the present invention controls and regulates the output voltage of the generator, with which it is used, by controlling and regulating the current which flows through the field winding of that generator. For example, whenever a change in the load on that generator tends to cause the output voltage of that generator to change, the combination exciter and regulator will respond to that incipient change in output voltage to change the value of the current flowing through the field winding of that generator and thereby hold the output voltage of that generator close to the desired value. Further, the combination exciter and regulator provided by the present invention has an amplifying sub-circuit which enables relatively small changes in the value of the output voltage to provide relatively large changes in the value of the current flowing through the field winding. As a result, the combination exciter and regulator provided by the present invention is able to respond quickly to incipient changes in the output voltage of the generator to hold that output voltage substantially constant. It is, therefore, an object of the present invention to provide a combination exciter and regulator that controls and regulates the output voltage of a generator, with which it is used, by controlling and regulating the current which flows through the field winding of that generator, and that has an amplifying sub-circuit which enables relatively small changes in the value of the output voltage to provide relatively large changes in the value of the current flowing through the field winding.

Other and further objects and advantages of the present invention should become apparent from an examination of the drawing and accompanying description.

In the drawing and accompanying description several preferred embodiments of the present invention are shown and described but it is to be understood that the drawing and accompanying description are for the purpose of illustration only and do not limit the invention and that the invention will be defined by the appended claims.

In the drawing, FIG. 1 is a schematic diagram of one form of combination exciter and regulator that is made in accordance with the principles and teachings of the present invention.

Figure 1:
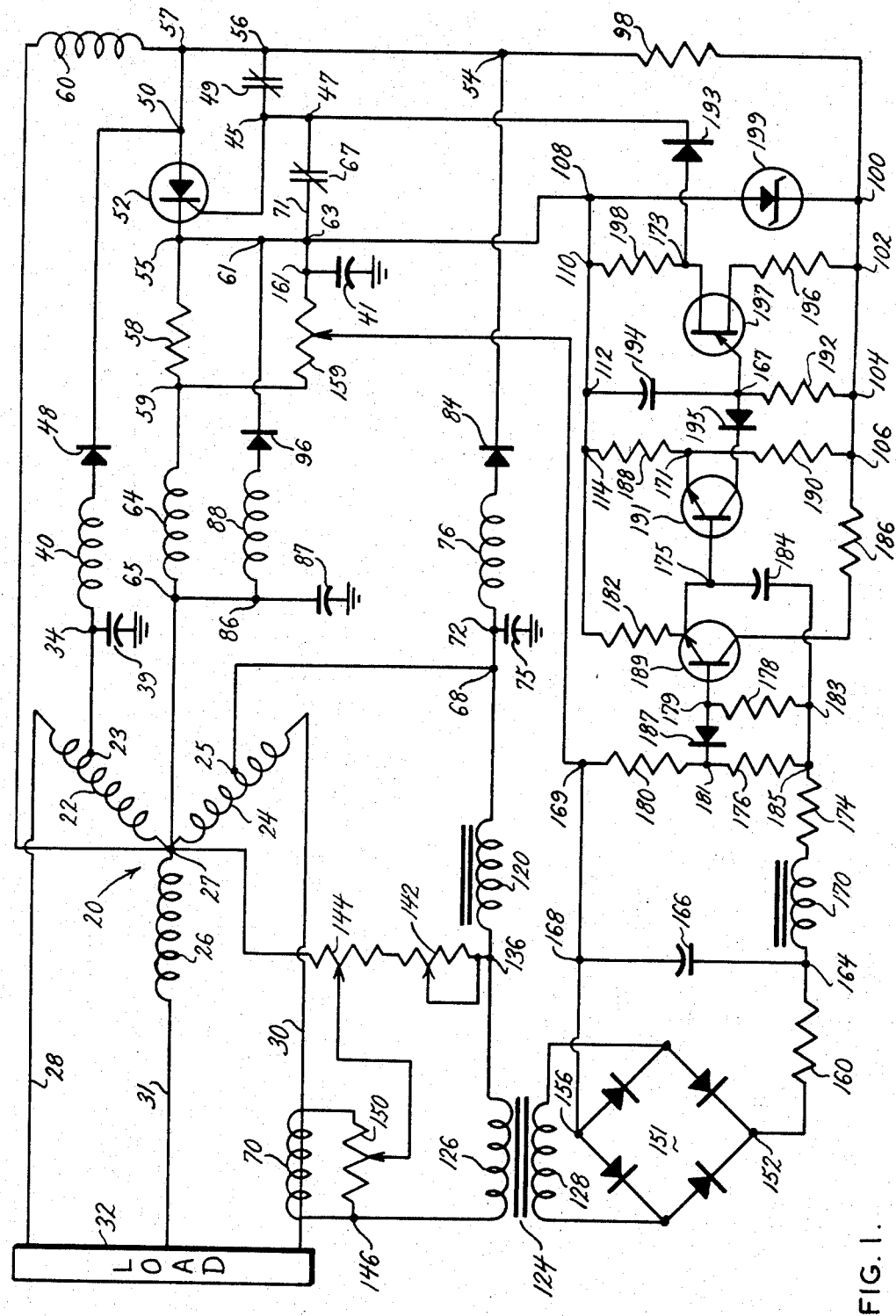

*Components of control system of FIG. 1*

Referring to FIG. 1 in detail, the numeral 20 generally denotes the Y connected stator winding of a three-phase alternating current generator. One phase of that stator winding is denoted by the numeral 22, the second phase of that stator winding is denoted by the numeral 24, and the third phase of that stator winding is denoted by the numeral 26. The inner terminals of the phases 22, 24 and 26 are connected together by a neutral terminal 27. The outer terminal of the phase 22 is connected to one terminal of a load 32 by a conductor 28, the outer terminal of the phase 24 is connected to a second terminal of that load by a conductor 30 and the primary winding of a current transformer 70, and the outer terminal of the phase 26 is connected to the third terminal of that load by a conductor 31. The phase 22 has a tap 23, and the phase 24 has a tap 25; and those taps coact to develop a single phase alternating current voltage which is smaller than the voltage between the outer terminals of those phases.

The numeral 52 denotes a controlled rectifier, and that controlled rectifier is preferably a silicon controlled rectifier. The cathode of that controlled rectifier is connected to the neutral terminal 27 of the stator winding 20 by a junction 55, a resistor 58, a junction 59, the revolving field winding 64 of the generator, and a junction 65. The tap 23 of the phase 22 is connected to the anode of the controlled rectifier 52 by a junction 34, a choke 40, a power rectifier 48 and a junction 50. The tap 25 of the phase 24 is connected to the anode of the controlled rectifier 52 by a junction 68, a junction 72, a choke 76, a power rectifier 84, and junctions 54, 56 and 57. A capacitor 39 is connected between junction 34 and ground, and that capacitor coacts with the choke 40 to filter out noise that could interfere with nearby radio and communication receivers. A capacitor 75 is connected between junction 72 and ground, and that capacitor coacts with the choke 76 to filter out noise that could interfere with nearby radio and communication receivers. While the chokes 40 and 76 and the capacitors 39 and 75 are desirable, they are not essential to the operation of the combination exciter regulator of the present invention.

A discharge diode 96 has the anode thereof connected to the left-hand terminal of the field winding 64 by a choke 88, a junction 86, and the junction 65. The cathode of that discharge diode is connected to the right-hand terminal of that field winding by a junction 61, junction 55, resistor 58, and junction 59. A capacitor 87 is connected between junction 86 and ground; and that capacitor coacts with the choke 88 to filter out noise that could interfere with nearby radio and communication receivers. While the capacitor 87 and the choke 88 are desirable, they are not essential to the operation of the combination exciter regulator of the present invention.

A relay coil 60 has one terminal thereof connected to the junction 50 by junction 57, and has the other terminal thereof connected to the neutral terminal 27 of the stator winding 20. That relay coil controls normally-closed contacts 49 which are connected between the anode and the gate of the controlled rectifier 52 by junctions 57 and 56 and a junction 45. The relay coil 60 also controls normally-closed contacts 67 which are connected between normally-closed contacts 49 and the cathode of controlled rectifier 52 by junction 45 and a junction 47, a length 71 of resistance wire, a junction 63, and junctions 61 and 55. The ohmic resistance of the length 71 of resistance wire is close to the conductive resistance of the controlled rectifier 52.

The normally-closed contacts 49 and 67 act, whenever they are closed, to provide a low resistance path in parallel with the controlled rectifier 52. That path is useful in permitting current to flow from tap 23 of phase 22 and from tap 25 of phase 24 through the field winding 64 during the first revolutions of that field winding, in the event the voltage developed by the generator is not high enough to cause "firing" of the controlled rectifier 52. Specifically, in the event the voltage developed by the generator is not high enough to cause "firing" of the controlled rectifier 52, current will flow from tap 23 of phase 22 via junction 34, choke 40, power rectifier 48, junctions 50, 57 and 56, still-closed contacts 49, junctions 45 and 47, still-closed contacts 67, length 71 of resistance wire, junctions 63, 61 and 55, resistor 58, junction 59, field winding 64, and junction 65 to the neutral terminal 27; and, a fraction of a second later, current will flow from tap 25 of phase 24 via junctions 68 and 72, choke 76, power rectifier 84, junctions 54 and 56, still-closed contacts 49, junctions 45 and 47, still-closed contacts 67, length 71 of resistance wire, junctions 63, 61 and 55, resistor 58, junction 59, field winding 64, and junction 65 to the neutral terminal 27. That current will enable the generator to generate a progressively-increasing voltage; and when that voltage becomes high enough it will cause the relay coil 60 to open the contacts 49 and 67 and then keep those contacts open. The voltage which is needed to enable the relay coil 60 to open the contacts 49 and 67 is higher than the voltage needed to cause "firing" of the controlled rectifier 52; and hence, by the time the relay coil 60 opens the contacts 49 and 67, the controlled rectifier 52 will be receiving "firing" signals and will become conductive as the contacts 49 and 67 open.

A reactor 120 has the right-hand terminal thereof connected to tap 25 of phase 24 by junction 68; and it has the left-hand terminal thereof connected to the neutral terminal 27 by a junction 136, a rheostat 142, and a potentiometer 144. The movable contact of the potentiometer 144 is directly connected to the movable contact of a potentiometer 150; and the latter potentiometer has one of the terminals thereof directly connected to one terminal of the secondary winding of the current transformer 70 while having the other terminal thereof connected to the other terminal of that secondary winding by a junction 146. The primary winding 126 of an isolation transformer 124 is connected between the junctions 136 and 146.

During the operation of the generator, a voltage will appear across the reactor 120, the rheostat 142 and the potentiometer 144; and that voltage will be the voltage between the neutral terminal 27 and the tap 25 of phase 24. Also, a voltage will appear across the primary winding 126 of isolation transformer 124; and that voltage will be the sum of the voltages across the upper section of rheostat 142, the lower section of potentiometer 144, and the left-hand section of potentiometer 150. The voltage across the potentiometer 150 will be proportional to the current flowing to the load 32 through phase 24.

The numeral 151 denotes a full wave bridge rectifier; and the input terminals of that bridge rectifier are connected to the terminals of the secondary winding 128 of the isolation transformer 124. Output terminal 152 of the bridge rectifier 151 is connected to the lower terminal of a voltage divider, which consists of a resistor 176 connected to a resistor 180 by a junction 181, by a resistor 160, a junction 164, an inductor 170, a resistor 174, and a junction 185. Output terminal 156 of the bridge rectifier 151 is connected to the upper terminal of that voltage divider by junctions 168 and 169. A capacitor 166 is connected between the junctions 164 and 168; and that capacitor will coact with the inductor 170 to filter the full-wave rectified current provided by the bridge rectifier 151.

The numeral 98 denotes a resistor which has the upper terminal thereof directly connected to the junction 54; and that resistor has the lower terminal thereof connected to the cathode of a Zener diode 199 by a junction 100. The anode of that Zener diode is connected to the junction 55 by a junction 108 and junctions 63 and 61; and hence that Zener diode and resistor 98 are connected in series with each other across the controlled rectifier 52. That Zener diode will, during those periods when the relay contacts 49 and 67 are open and the controlled rectifier 52 is non-conductive, keep the voltage between junctions 100 and 108 close to a predetermined value. The junction 100 is connected to the collector of an NPN transistor 189 by junctions 102, 104 and 106 and resistor 186, is connected to the emitter of an NPN transistor 191 by junctions 102, 104 and 106, resistor 190 and junction 171, is connected to the emitter of a unijunction transistor 197 by junctions 102 and 104, resistor 192 and junction 167, and is connected to base-two of that unijunction transistor by junction 102 and resistor 196. Junction 108 is connected to the emitter of transistor 189 by junctions 110, 112 and 114 and resistor 182, is connected to the emitter of transistor 191 by junctions 110, 112 and 114, resistor 188, and junction 171, is connected to the emitter of unijunction transistor 197 by junctions 110 and 112, capacitor 194 and junction 167, and is connected to base-one of that unijunction transistor by junction 110, resistor 198, and junction 173. A diode 195 has the anode thereof connected to the junction 167 and has the cathode thereof connected to the collector of transistor 191; and a junction 175 connects the base of transistor 191 to the emitter of transistor 189.

A resistor 178 has the lower terminal thereof connected to the lower terminal of the voltage divider, which consists of resistors 176 and 180, by junctions 183 and 185; and the upper terminal of that resistor is connected to the upper terminal of that voltage divider by junction 179, the base-emitter circuit of transistor 189, resistor 182, junctions 114, 112, 110, 108, 63 and 161; the right-hand section of potentiometer 159, and junction 169. A capacitor 184 is connected in parallel with the series-connected resistor 178 and the base-emitter circuit of transistor 189. A diode 187 is connected between junction 181 and the base of transistor 189 to keep current from flowing from that junction to that base. The left-hand terminal of potentiometer 159 is connected to junction 59, and the right-hand terminal of that potentiometer is connected to the junction 55 by junctions 161, 63 and 61; and hence that potentiometer is connected in parallel with the resistor 58. A capacitor 41 is connected between junction 161 and ground; and that capacitor by-passes noise to ground. A diode 193 and junctions 47 and 45 connect the junction 173, adjacent base-one of unijunction transistor 197, to the gate of the controlled rectifier 52.

The series-connected resistors 190 and 188 are connected in parallel with the Zener diode 199. The series-connected resistor 192 and capacitor 194 also are connected in parallel with that Zener diode. Resistor 192, diode 195, the collector-emitter circuit of transistor 191, and resistor 188 are connected in series with each other and are connected in parallel with that Zener diode. Resistor 196 and resistor 198 connect the base-two, base-one circuit of unijunction transistor 197 in parallel with the Zener diode 199. Resistor 186 and resistor 182 connect transistor 189 in parallel with that Zener diode.

*Operation of control system of Fig. 1*

Figure 2:
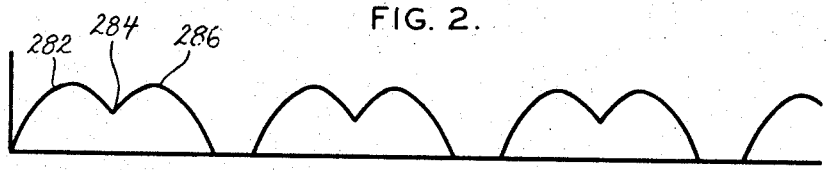
FIG. 2 is an idealistic wave form of the voltages between junction 50 and the neutral terminal 27 of FIG. 1.

When the prime mover for the generator starts rotating the rotor of that generator, the residual magnetic flux in that generator will cause voltages to be developed successively across each of the phases 22, 24 and 26. The voltage across the phase 22 will make the tap 23 positive relative to the neutral terminal 27; and, as indicated by the numeral 282 in FIG. 2, that voltage will increase from zero volts at zero electrical degrees to a maximum value at ninety degrees, and then start to decrease. At one hundred and twenty degrees, the voltage across the phase 24 will make the tap 25 positive relative to the neutral terminal 27; but that voltage will be smaller than the voltage between tap 23 and that neutral terminal. However, at one hundred and fifty degrees, the voltage between tap 25 and the neutral terminal 27 will equal the voltage between tap 23 and that neutral terminal, as indicated by the numeral 284 in FIG. 2. The voltage across phase winding 22 will continue to decrease until it becomes zero at one hundred and eighty degrees; but the voltage across phase winding 24 will increase to a maximum value at two hundred and ten degrees, as indicated by the numeral 286 in FIG. 2, and then decrease to zero at three hundred degrees. At two hundred and forty degrees, the voltage across phase 26 will make the outer terminal of that phase positive relative to the neutral terminal 27; but that voltage will be smaller than the voltage across phase 24. At two hundred and seventy degrees, the voltage across phase 26 will equal the voltage across phase 24; and the former voltage wlil rise to a maximum value at three hundred and thirty degrees and then fall to zero at sixty degrees of the second electrical cycle of the generator. The voltage across phase 26 does not appear in FIG. 2; because FIG. 2 shows the voltages between junction 50 and the neutral terminal 27.

As the voltage at the tap 23 becomes positive relative to the voltage at the neutral terminal 27, current will flow from that tap via junction 34, choke 40, power rectifier 48, junctions 50 and 57, and relay coil 60 to that neutral terminal. Thereafter, as the voltage at the tap 25 becomes positive relative to the voltage at the tap 23, current will flow from tap 25 via junctions 68 and 72, choke 76, power rectifier 84, junctions 54, 56 and 57, and relay coil 60 to the neutral terminal 27. During a number of the initial electrical cycles generated by the generator, the voltages developed across the phases 22 and 24 will not be great enough to force sufficient current to flow through relay coil 60 to cause that relay coil to open the normally-closed contacts 49 and 67. As a result, those contacts will remain in closed position during those initial electrical cycles.

During the first revolution of the rotor of the generator, current will flow from the outer terminal of phase 22 via conductor 28, the upper part of load 32, conductor 31 and phase 26 to the neutral terminal 27; and current also will flow from tap 23 via junction 34, choke 40, power rectifier 48, junctions 50 and 57, and relay coil 60 to that neutral terminal. Current additionally will flow from tap 23 via junction 34, choke 40, power rectifier 48, junctions 50, 57 and 56, still-closed relay contacts 49, junctions 45 and 47, still-closed relay contacts 67, length 71 of resistance wire, junctions 63, 61 and 55, resistor 58, junction 59, field winding 64, and junction 65 to the neutral terminal 27. Moreover, current will flow from tap 23 via junction 34, choke 40, power rectifier 48, junctions 50, 57, 56 and 54, and resistor 98 to junction 100, then through five of the six parallel current paths, namely, Zener diode 199, resistor 192 and capacitor 194, resistor 192 and diode 195 and the collector-emitter circuit of transistor 191 and resistor 188, resistor 190 and resistor 188, and resistor 186 and the collector-emitter circuit of transistor 189 and resistor 182, junctions 108, 63, 61 and 55, resistor 58, junction 59, field winding 64, and junction 65 to the neutral terminal 27. Thereafter, as the voltage at the tap 25 becomes positive relative to the voltage at the tap 23, current will flow from the outer terminal of phase 24 via conductor 30, the primary winding of current transformer 70, the lower part of load 32, conductor 31, and phase 26 to the neutral terminal 27; and current also will flow from tap 25 via junctions 68 and 72, choke 76, power rectifier 84, junctions 54, 56 and 57, and the relay coil 60 to that neutral terminal. Current additionally will flow from tap 25 via junctions 68 and 72, choke 76, power rectifier 84, junctions 54 and 56, still-closed relay contacts 49, junctions 45 and 47, still-closed relay contacts 67, length 71 of resistance wire, junctions 63, 61 and 55, resistor 58, junction 59, field winding 64, and junction 65 to the neutral terminal 27. Moreover, current will flow from tap 25 via junctions 68 and 72, choke 76, power rectifier 84, junction 54, and resistor 98 to junction 100, then through five of the six parallel current paths, namely, Zener diode 199, resistor 192 and capacitor 194, resistor 192 and diode 195 and the collector-emitter circuit of transistor 191 and resistor 188, resistor 190 and resistor 188, and resistor 186 and the collector-emitter circuit of transistor 189 and resistor 182, junctions 108, 63, 61 and 55, resistor 58, junction 59, field winding 64, and junction 65 to the neutral terminal 27. The resulting flow of current through the field winding 64 for about three hundred electrical degrees will enable the generator to increase the voltages that are successively developed across the phases 22 and 24. However, as pointed out hereinbefore, those voltages will not, during a number of the initial electrical cycles generated by the generator be great enough to force sufficient current to flow through relay coil 60 to cause that relay coil to open the normally-closed contacts 49 and 67.

Subsequently, as the voltage at the outer terminal of phase 26 exceeds the voltages at the outer terminals of phases 24 and 22, current will flow from the outer terminal of phase 26 via conductor 31, the lower part of load 32, the primary winding of current transformer 70, conductor 30 and phase 24 to the neutral terminal 27. Current will also flow from the outer terminal of phase 26 via conductor 31, the upper part of load 32, conductor 28, and phase 22 to that neutral terminal.

For one hundred and eighty degrees of each cycle, current also will flow from tap 25 via junction 68, reactor 120, junction 136, rheostat 142, and potentiometer 144 to the neutral terminal 27. Also, current will flow from tap 25 via junction 68, reactor 120, junction 136, and primary winding 126 of isolating transformer 124 to junction 146, then through the secondary winding of current transformer 70 and the right-hand section of potentiometer 150 and also through the left-hand section of that potentiometer, and thereafter through the upper section of potentiometer 144 to the neutral terminal 27. Subsequently, the voltage at the tap 25 will become negative relative to the neutral terminal 27; and, thereupon, current will flow from that neutral terminal via potentiometer 144, rheostat 142, junction 136, reactor 120, and junction 68 to the tap 25. Also, current will flow from that neutral terminal via the upper section of potentiometer 144 to the movable contact of potentiometer 150, then through the right-hand section of potentiometer 150 and the secondary winding of current transformer 70 and also through the left-hand section of potentiometer 150, junction 146, primary winding 126, junction 136, reactor 120, and junction 68 to the tap 25. The reactor 120 has a high inductive reactance; and, whenever a positive voltage at tap 25 causes current to flow successively through that reactor and rheostat 142 and potentiometer 144, that reactor will keep that current flowing until the voltage at tap 25 becomes sufficiently negative relative to the neutral terminal 27 to force the current flowing through that reactor, that rheostat and that potentiometer to change direction. Thereafter, the reactor will keep current flowing successively through potentiometer 144 and rheostat 142 and itself until the voltage at tap 25 again becomes sufficiently positive relative to the neutral terminal 27 to force the current flowing through that potentiometer, that rheostat and that reactor to change direction once again. The resulting alternations of current flowing through series-connected rheostat 142 and potentiometer 144 will develop an A.C. voltage across that rheostat and potentiometer; and the movable contact of that potentiometer and the left-hand section of potentiometer 150 will apply the A.C. voltage across rheostat 142 and the lower section of potentiometer 144 to the terminals of the primary winding 126 of isolation transformer 124.

For one hundred and eighty degrees of each cycle of the generator, the positive voltage at the outer terminal of phase 24 will cause current to flow from right to left in the primary winding of current transformer 70; and for one hundred and eighty degrees of each cycle, the positive voltage at the outer terminal of phase 26 will cause current to flow from left to right in that primary winding. The resulting alternations of current in that primary winding will develop an A.C. voltage across the potentiometer 150; and the movable contact of that potentiometer and the rheostat 142 and the lower section of potentiometer 144 will apply the A.C. voltage across the left-hand section of potentiometer 150 to the terminals of primary winding 126 of isolation transformer 124.

The primary winding 126 of isolation transformer 124 will sum the A.C. voltages across the left-hand section of potentiometer 150 and across rheostat 142 and the lower section of potentiometer 144; and the secondary winding 128 of that isolation transformer will develop a transformer A.C. voltage across its terminals. That transformer A.C. voltage will be applied to the input terminals of the full wave bridge rectifier 151. Direct current will then flow from output terminal 152 of that bridge rectifier via resistor 160, junction 164, filter choke 170, and resistor 174 to junction 185; and then part of that current will flow through resistors 176 and 180 to junction 169, another part of that current will flow through resistor 178 and diode 187 and resistor 180 to that junction, and still another part of that curent will flow through resistor 178, the base-emitter circuit of transistor 189, resistor 182, and the right-hand section of potentiometer 159 to that junction. Thereafter, the re-united parts of the current will flow via junction 168 to the other output terminal of the bridge rectifier 151. The flow of direct current through the base-emitter circuit of transistor 189 will render that transistor conductive.

Because the transistor 189 is conductive, current will flow through the collector-emitter circuit of that transistor whenever the voltage at tap 23 or at tap 25 is positive relative to the neutral terminal 27—that current flowing from tap 23 via junction 34, choke 40, power rectifier 48, junctions 50, 57, 56 and 54, resistor 98, junctions 100, 102, 104 and 106, resistor 186, the collector-emitter circuit of transistor 189, resistor 182, junctions 114, 112, 110, 108 and 63, either through junctions 61 and 55 and resistor 58 to junction 59 or through junction 161 and potentiometer 159 to that junction, and then through field winding 64 and junction 65 to that neutral terminal, or flowing from tap 25 via junctions 68 and 72, choke 76, power rectifier 84, junction 54, resistor 98, junctions 100, 102, 104 and 106, resistor 186, the collector-emitter circuit of transistor 189, resistor 182, junctions 114, 112, 110, 108 and 63, either through junctions 61 and 55 and resistor 58 to junction 59 or through junction 161 and potentiometer 159 to that junction, and then through field winding 64 and junction 65 to that neutral terminal. The current flowing through the resistor 182 will establish a D.C. voltage drop across that resistor; and that D.C. voltage drop will cause the base of transistor 191 to become positive with respect to the junction 114. That D.C. voltage drop is a function of the current flowing through, and thus of the conductivity of, the collector-emitter circuit of transistor 189. That conductivity is proportional to the biasing current flowing through the base-emitter circuit of transistor 189; and that biasing current is—because of reactor 120, rheostat 142, potentiometer 144, current transformer 70, potentiometer 150, and isolation transformer 124—a function of the output voltage and of the output current of the generator.

The diode 195, the collector-emitter circuit of transistor 191, and the resistor 188 act as a variable resistance shunt to the capacitor 194; and the conductivity of that collector-emitter circuit will affect the rate at which that capacitor charges. The current which flows from tap 23 or tap 25 via junction 54, resistor 98, junctions 100, 102, 104 and 106, resistor 190, junction 171, resistor 188, junctions 114, 112, 110, 108, 63, 61 and 55, resistor 58, junction 59, field winding 64, and junction 65 to neutral terminal 27 will establish a D.C. voltage across resistor 188; and that voltage will make the voltage at the emitter of transistor 191 positive relative to the voltage at junction 114. The value of resistor 188 is selected so the voltage between the emitter of transistor 191 and junction 114 will, whenever the generator output voltage is at the desired level, be close to the voltage between the base of that transistor and that junction. All of this means that whenever the generator output votlage is at the desired level and the desired amount of current is flowing through resistor 138, the voltage drop across that resistor will make the resistance of the collector-emitter circuit of transistor 191 high—thereby causing the desired amount of the current to flow through resistor 192 and charge capacitor 194.

The voltage across the capacitor 194 will increase as that capacitor charges; and that voltage will be applied to the emitter of unijunction transistor 197 and to the upper terminal of resistor 198. When that voltage exceeds the emitter peak point voltage of that unijunction transistor, that unijunction transistor will "fire" and become conductive; and the diode 193 will then apply the resulting positive voltage at junction 173 to the gate of the controlled rectifier 52. That diode will thus serve to apply "firing" signals to the gate of that controlled rectifier. That diode will also perform another function, namely, it will keep the resistor 198 from shunting the gate-to-cathode circuit of controlled rectifier 52 after the relay contacts 67 have been opened.

The value of resistor 98 is made low enough to permit sufficient current to flow through the Zener diode 199 to establish the rated voltage drop across that Zener diode. However, the value of that resistor is made high enough to limit the current flowing through that Zener diode to a value which is too low to injure that Zener diode. The values of resistors 196 and 198 are quite small relative to the resistance of the base-two base-one circuit of unijunction transistor 197 prior to the time that unijunction transistor is rendered conductive. However, the value of resistor 198 is high relative to the resistance of the emitter base-one circuit of that unijunction transistor 197 after that unijunction transistor has been rendered conductive. The value of resistor 192 is high relative to the value of resistor 198; but the value of resistor 192 is made as low as it can be made without causing that resistor to shunt the Zener diode 199. The value of capacitor 194 is small enough to appreciably limit the amount of energy that is discharged through the emitter base-one circuit of unijunction transistor 197 and applied to the gate-to-cathode circuit of the controlled rectifier 52. The values of capacitor 194 and of resistor 198 are such that the time interval between the "firing" of unijunction transistor 197 and the "firing" of controlled rectifier 52 is so short that it can be ignored.

During the initial revolutions of the rotor of the generator, the residual magnetic flux in the generator is relied upon to cause voltages to be developed successively across the phases 22, 24 and 26; and the voltages across the inner sections of phases 22 and 26 will be applied across still-closed relay contacts 49 and 67, and length 71 of resistance wire and resistor 58 and field winding 64, will be applied across relay coil 60, and will be applied across Zener diode 199 and the five current paths in parallel with that Zener diode. The voltages across those inner sections will initially be too small to actuate the relay coil 60; and hence the relay contacts 49 and 67 will initially remain closed. The voltages across those inner sections will cause current to flow through those still-closed relay contacts, length 71 of resistance wire, resistor 58, and field winding 64 from zero to three hundred degrees of each of those revolutions; and that current will enable the generator to increase the voltages across those inner sections. Very quickly, the voltages across those inner sections will reach and exceed values which would be high enough to enable the capacitor 194 to charge to the point where the voltage across that capacitor could cause "firing" of the unijunction transistor 197; but, as long as the relay contacts 49 and 67 remain closed, those relay contacts and the length 71 of resistance wire will hold the voltage across series-connected resistor 192 and capacitor 194 to such a low value that the voltage across that capacitor can not "fire" that unijunction transistor.

After a limited number of revolutions of the rotor of the generator, the voltages across the inner sections of the phases 22 and 24 will increase to the point where enough current will flow through relay coil 60 to cause that coil to open the relay contacts 49 and 67. Once that relay coil has opened those relay contacts, it will keep them open as long as the rotor continues to rotate—even though current flows through that relay coil for only three hundred degrees during each revolution of that rotor. As soon as the relay contacts 49 and 67 opened, the current flowing through capacitor 194 will increase; and, very quickly, the voltage across that capacitor will increase until it reaches the emitter peak point voltage of the unijunction transistor 197. Thereupon, that unijunction transistor will become conductive; and the capacitor 194 will discharge through the emitter base-one circuit of that unijunction transistor. The resulting current that flows through resistor 198 will add to the current which will be flowing through resistor 196, the base-two base-one circuit of unijunction transistor 197, and resistor 198 and will also add to the current which will be flowing through resistor 192, the emitter base-one circuit of that unijunction transistor, and resistor 198 to provide an appreciable voltage pulse of short duration across the resistor 198. That voltage pulse will be applied to the gate-to-cathode circuit of the controlled rectifier 52 by diode 193 and junctions 47 and 45; and that pulse will render that controlled rectifier conductive. After the relay contacts 49 and 67 have been opened, the "on" time of the controlled rectifier 52 will control the average value of current flowing through the field winding 64, and will thus control the output voltage of the generator.

As indicated by FIG. 2, the voltage between junction 50 and the neutral terminal 27 rises from zero volts at zero degrees to a maximum at ninety degrees, decreases from ninety degrees to one hundred and fifty degrees, rises again until it again reaches a maximum at two hundred and ten degrees, and then decreases to zero at three hundred degrees. That voltage will then remain at zero until the start of the next-succeeding electrical cycle of the generator; and, during that next-succeeding cycle, and also during each subsequent cycle of the generator, that voltage will rise from zero volts at zero degrees to a maximun at ninety degrees, will decrease from ninety degrees to one hundred and fifty degrees, will again rise to a maximum at two hundred and ten degrees, and will again fall to zero volts at three hundred degrees. This means that the maximum voltage which can be applied to the field winding 64 is the two phase, half-wave, line-to-neutral, D.C. voltage developed across the inner sections of phases 22 and 24; and the value of that voltage is slightly less than one-half of the root means square of the voltage developed by the generator between the taps 23 and 25.

If desired, the junction 34 could be connected to the outer terminal of phase 22 rather than to the tap 23; and, similarly, the junction 68 could be connected to the outer terminal of phase 24 rather than to the tap 25. If that were done, and if the generator were designed to develop a line-to-line voltage of two hundred and forty volts, the maximum possible voltage that could be applied to the field winding 64 would be about one hundred and fifteen volts D.C. However, that field winding is wound so it does not require that much voltage; and hence that field winding will readily respond to the lesser voltages developed across the inner sections of the phase 22 and 24. Also, that field winding is wound so it will readily respond to the small voltages, developed across the inner sections of phases 22 and 24 by the residual magnetic flux in the generator during the first revolutions of the rotor of that generator, to increase the output voltage of that generator. Also, that field winding is wound so it readily responds to the reduced average voltage, supplied to it by the controlled rectifier 52 during its "on" times, to keep the generator output voltage at the desired level.

Whenever the controlled rectifier 52 becomes conductive, it acts as a low-resistance shunt for the Zener diode 199 and the five current paths in parallel with that Zener diode. That controlled rectifier will be rendered conductive between zero and three hundred electrical degrees of each cycle of the generator, after the relay contacts 49 and 67 have been opened; and that controlled rectifier will remain conductive until three hundred electrical degrees are reached. Consequently, the Zener diode 199 and the five current paths in parallel with that Zener diode will have only a very small voltage applied to them for a finite period of time prior to three hundred degrees. Because the voltage between junction 50 and the neutral terminal 27 is essentially zero from three hundred degrees to the end of each cycle of the generator, the Zener diode 199 and the five current paths in parallel with that Zener diode will have practically no voltage applied to them immediately prior to the beginning of each cycle of the generator. However, for three hundred degrees of each cycle, current will flow through the sub-circuit which includes reactor 120, rheostat 142 and potentiometer 144, and further current will flow through the sub-circuit which includes the secondary winding of current transformer and potentiometer 150; and the sum of the resulting voltages across the left-hand section of potentiometer 150, across the lower section of potentiometer 144, and across the upper section of rheostat 142 will force current to flow through the primary winding 126 of isolation transformer 124. The secondary winding 128 of that isolation transformer will then coact with the full wave bridge rectifier 151 to cause direct current to flow through resistor 178, the base-emitter circuit of transistor 189, resistor 182, and the right-hand section of transistor 159; and that current will render that transistor conductive, even when practically no voltage is applied to the Zener diode 199 and the five current paths in parallel with that Zener diode.

During any given electrical cycle of the generator, after the contacts 49 and 67 have been opened, both the controlled rectifier 52 and the Zener diode 199 will initially be non-conductive. Consequently, no appreciable voltage will initially be applied to the field winding 64. However, as the voltage across the phase 22 increases, the voltage across the Zener diode 199 will rise to the rated voltage drop of that Zener diode, all as pointed out hereinbefore; and current will flow through capacitor 194 and charge that capacitor, all as pointed out hereinbefore. As the voltage across that capacitor reaches the emitter peak point voltage of the unijunction transistor 197, that unijunction transistor will "fire"; and, immediately thereafter, the controlled rectifier 52 will "fire" and will apply a voltage to the field winding 64.

Figure 3:
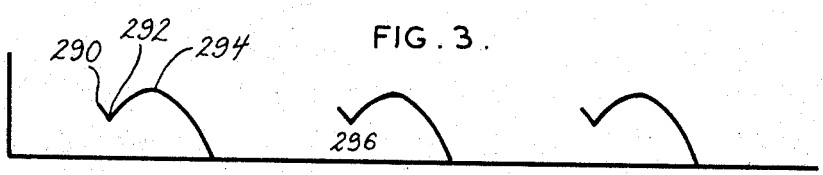
FIG. 3 is an idealistic wave form of the voltages across the field winding 64 of FIG. 1.

If it is assumed that the controlled rectifier 52 is rendered conductive at about one hundred and thirty electrical degrees of a given cycle, the voltage which is denoted by the numeral 290 in FIG. 3 will be applied to the field winding 64 by power rectifier 48 and controlled rectifier 52. That voltage will decrease in value from one hundred and thirty degrees to one hundred and fifty degrees, as indicated by the numeral 292 in FIG. 3; and then, as the voltage across phase 24 exceeds the voltage across phase 22, the power rectifier 84 and the controlled rectifier 52 will apply a voltage to the field winding 64. That voltage will rise to a maximum at two hundred and ten degrees, as indicated by the numeral 294 in FIG. 3; and, subsequently, that voltage will fall to zero at three hundred degrees.

The voltage that taps 23 and 25 develop between junction 50 and the neutral treminal 27 will then remain at zero throughout the rest of the said given cycle of the generator. This is desirable, because it gives the controlled rectifier 52 sufficient time to again become non-conductive. That controlled rectifier will then remain non-conductive until one hundred and thirty degrees of the next-succeeding cycle of the generator; but will then be rendered conductive once again to apply the voltage pulse 296, shown in FIG. 3, to the field winding 64.

Although the field winding 64 will have a series of voltage pulses, rather than a continuous voltage, applied to it, that field winding will conduct current continuously. Specifically, that field winding will store up substantial inductive energy as a voltage pulse forces current to flow through it; and that inductive energy will tend to keep current flowing through that field winding after the end of that voltage pulse. The discharge diode 96 enables the inductive energy, stored up within the field winding 64, to keep current flowing through that field winding—that current flowing from the left-hand terminal of that field winding via junctions 65 and 86, choke 88, discharge diode 96, junctions 61 and 55, resistor 58, and junction 59 to the right-hand terminal of that field winding. During the periods when voltage pulses are being applied to the field winding 64, the level of the current flowing through that field winding will increase—as indicated by the numeral 300 in FIG. 4; and during the periods between those voltage pulses, the level of the current flowing through that field winding will decrease—as indicated by the numeral 302 in FIG. 4. However, the level of current flowing through that field winding will always be above zero as long as the rotor of the generator is rotating.

Figure 5:
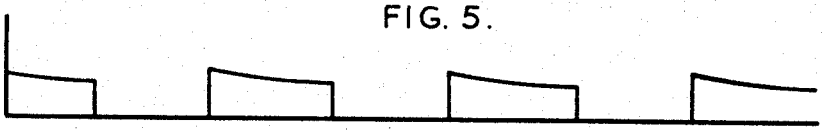
FIG. 5 is an idealistic wave form of the current flowing through the discharge diode 96 of FIG. 1.
Figure 6:
FIG. 6 is an idealistic wave form of the current flowing through the power rectifier 48 of FIG. 1.
Figure 7:
FIG. 7 is an idealistic wave form of the current flowing through the power rectifier 84 of FIG. 1.

During each cycle of the generator, current will flow through the power rectifier 84 and will subsequently flow through the discharge diode 96; and, if the unijunction transistor 197 is rendered conductive before one hundred and fifty degrees, current will initially flow through the power rectifier 48. The current that flows through the discharge diode 96 will flow as pulses during those periods when the field winding 64 is not receiving a voltage from phase 22 or phase 26; and those current pulses are shown in FIG. 5. Current pulses will flow through the power rectifier 48 in any cycle wherein the unijunction transistor 197 is rendered conductive prior to one hundred and fifty degrees; and those current pulses are shown in FIG. 6. Current pulses will flow through the power rectifier 84 until three hundred degrees; and those current pulses are shown in FIG. 7.

The value of the output voltage of the generator can easily be adjusted by adjusting the position of the movable contact of potentiometer 144. Shifting that movable contact upwardly will increase the value of the voltage which is applied to the primary winding 126 of transformer 124, and will thus increase the value of the voltage induced in the secondary winding 128 of that transformer. The resulting increase in the voltage applied to the input terminals of bridge rectifier 151 will increase the current which flows through series-connected resistors 174 and 178, the base-emitter circuit of transistor 189, resistor 182, and the right-hand section of potentiometer 159; and that increased current flow will make the collector-emitter circuit of that transistor more conductive. More current will then flow through resistor 182, thereby making the base of transistor 191 more positive with respect to the emitter of that transistor. The resulting increase in conductivity of the collector-emitter circuit of transistor 191 will cause hat transistor to conduct a greater percentage of the current, and thus cause capacitor 194 to conduct a lesser percentage of the current, flowing from junction 54 via resistor 98, junctions 100, 102, and 104 and resistor 192. Because capacitor 194 will conduct a lesser percentage of that current, that capacitor will take a longer time to charge; and hence the unijunction transistor 197 and the controlled rectifier 52 will be "fired" closer to the end of each electrical cycle. The resulting decrease in "on" time of that controlled rectifier will reduce the level of the current flowing through the field winding 64; and that reduction in current level will automatically reduce the level of the output voltage of the generator. This means that a decrease in the output voltage of the generator can be attained by merely shifting the movable contact of potentiometer 144 upwardly.

To increase the output voltage of the generator, it is only necessary to shift the movable contact of potentiometer 144 downwardly. Shifting that movable contact downwardly will decrease the value of the voltage which is applied to the primary winding 126 of transformer 124, and will thus decrease the value of the voltage induced in the secondary winding 128 of that transformer. The resulting decrease in the voltage applied to the input terminals of bridge rectifier 151 will decrease the current which flows through series-connected resistors 174 and 178, the base-emitter circuit of transistor 189, resistor 182, and the right-hand section of potentiometer 159; and that decreased current flow will make the collector-emitter circuit of that transistor less conductive. Less current will then flow through resistor 182, thereby making the base of transistor 191 less positive with respect to the emitter of that transistor. The resulting decrease in conductivity of the collector-emitter circuit of transistor 191 will cause that transistor to conduct a lesser percentage, and thus cause the capacitor 194 to conduct a greater percentage, of the current flowing from junction 54 via resistor 98, junctions 100, 102 and 104, and resistor 192. Because capacitor 194 will conduct a greater percentage of that current, that capacitor will take less time to charge; and hence the uniqunction transistor 197 and the controlled rectifier 52 will be "fired" closer to the beginning of each electrical cycle. The resulting increase in "on" time of that controlled rectifier will increase the level of the current flowing through the field winding 64; and that increase in current level will automatically increase the level of the output voltage of the generator.

FIG. 3 shows the voltage pulses which are applied to the field winding 64 when the movable contact of potentiometer 144 is set to cause the unijunction transistor 197 and the controlled rectifier 52 to "fire" at about one hundred and thirty degree during each electrical cycle of the generator. If that movable contact were to be shifted downwardly, the voltage pulses of FIG. 3 would start closer to the beginning of each electrical cycle of the generator, and hence would have a longer duration. That longer duration would increase the level of the current flowing through the field winding 64 above the level shown in FIG. 4; and that increased current level would automatically increase the level of the output voltage of the generator. On the other hand, if the movable contact of potentiometer 144 were to be shifted upwardly, the voltage pulses of FIG. 3 would start closer to the end of each electrical cycle of the generator and hence would have a shorter duration. That shorter duration would decrease the level of the current flowing through the field winding 64 below the level shown in FIG. 4; and that decreased current level would automatically decrease the level of the output voltage of the generator. If the unijunction transistor 197 and the controlled rectifier 52 are not "fired" until after one hundred and fifty degrees, the power rectifier 48 will not conduct current—and all of the current which flows through the field winding 64 will flow through the power rectifier 84 or the discharge diode 96.

Once the movable contact of potentiometer 144 has been adjusted to select a desired output voltage for the generator, the combination exciter and regulator of FIG. 1 will enable that generator to keep that voltage substantially constant despite changes in load, as long as those changes in load are not made abruptly. In one preferred embodiment of the present invention, the unijunction transistor 197 and the controlled rectifier 52 will be "fired" about one hundred and thirty degrees after the beginning of each cycle of the generator, where the movable contact of potentiometer 144 has been set to cause that generator to supply two hundred and forty volts and where that generator is operating under full load. That unijunction transistor and that controlled rectifier will be "fired" about two hundred and twenty degrees after the beginning of each cycle, if the setting of that movable contact is left unchanged but the load is disconnected from the generator. That unijunction transistor and that controlled rectifier will be "fired" between one hundred and thirty degrees and two hundred and twenty degrees after the beginning of each cycle of the generator, if the setting of that movable contact is left unchanged but the generator is operating under load conditions between full load and no load.

Figure 4:
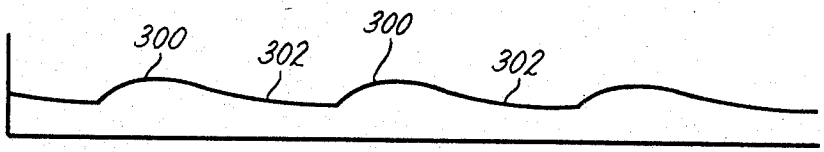
FIG. 4 is an idealistic wave form of the current flowing through the field winding 64 of FIG. 1.

FIG. 3 is an idealistic showing of the voltage pulses that are applied to the field winding 64 when the generator is supplying two hundred and forty volts and is operating under full load; and FIG. 4 is an idealistic showing of the current flowing through that field winding as a result of those voltage pulses. When that generator supplies two hundred and forty volts under no load conditions, the voltage pulses that are applied to the field winding 64 will be much shorter than the voltage pulses shown in FIG. 3—having durations as short as eighty degrees rather than one hundred and seventy degrees. The level of the current flowing through the field winding 64 under no load conditions will be less than the level of the current represented by FIG. 4, and in the said preferred embodiment of the present invention, that current level will be about one-fourth of the level of the current represented by FIG. 4.

If, at any given setting of the movable contact of the potentiometer 144, the stator voltage of the generator tends to decrease, because of a change in the load, heating of the field winding 64, or some other cause, the voltage across the sub-circuit consisting of reactor 120, rheostat 142 and potentiometer 144 will decrease; and the current flowing through the primary winding of current transformer 70 will decrease. The resulting decreases in the voltages across the upper section of rheostat 142, the lower section of potentiometer 144, and the left-hand section of potentiometer 150 will decrease the voltage applied to the primary winding 126 of isolation transformer 124; and will thus decrease the voltage induced in the secondary winding 128 of that transformer. The resulting decrease in the current flowing through series-connected resistors 174 and 178, the base-emitter circuit of transistor 189, resistor 182, and potentiometer 159 will reduce the conductivity of that transistor. The resulting decrease in the current flowing through resistor 182 will make the voltage at the base of transistor 191 less positive relative to the voltage at the emitter of that transistor, and will thereby decrease the conductivity of that transistor. As a result, that transistor will conduct a lesser percentage, and the capacitor 194 will conduct a greater percentage, of the current flowing from tap 23 or tap 25 via junction 54, resistor 98, junctions 100, 102 and 104, and resistor 192 to junction 167. Because capacitor 194 will conduct a greater percentage of that current, that capacitor will take less time to charge; and hence the unijunction transistor 197 and the controlled rectifier 52 will be "fired" closer to the beginning of each cycle of the generator. The resulting increase in "on" time of that controlled rectifier will increase the level of the current flowing through the field winding 64, and that increase in current level will automatically restore the output voltage of the generator to the desired level. It should be noted that the effect which decreases in the current flowing through the primary winding of current transformer 70 has upon the value of the current flowing through the base-emitter circuit of transistor 189 is very small compared to the effect which decreases in the voltages across rheostat 142 and potentiometer 144 have upon that value.

If, at any given setting of the movable contact of the potentiometer 144, the stator voltage of the generator tends to increase, because of a change in the load or some other cause, the voltage across the sub-circuit consisting of reactor 120, rheostat 142 and potentiometer 144 will increase; and the current flowing through the primary winding of current transformer 70 will increase. The resulting increases in the voltages across the upper section of rheostat 142, the lower section of potentiometer 144, and the left-hand section of potentiometer 150 will increase the voltage applied to the primary winding 126 of isolation transformer 124; and will thus increase the voltage induced in the secondary winding 128 of that transformer. The resulting increase in the current flowing through series-connected resistors 174 and 178, the base-emitter circuit of transistor 189, resistor 182, and potentiometer 159 will increase the conductivity of that transistor. The resulting increase in the current flowing through resistor 182 will make the voltage at the base of transistor 191 more positive relative to the voltage at the emitter of that transistor, and will thereby increase the conductivity of that transistor. As a result, that transistor will conduct a greater percentage, and the capacitor will conduct a lesser percentage, of the current flowing from tap 23 or tap 25 via junction 54, resistor 98, junctions 100, 102 and 104, and resistor 192 to junction 167. Because capacitor 194 will conduct a lesser percentage of that current, that capacitor will take a longer time to charge; and hence the unijunction transistor 197 and the controlled rectifier 52 will be "fired" closer to the end of each cycle of the generator. The resulting decrease in "on" time of that controlled rectifier will reduce the level of the current flowing through the field winding 64, and that reduction in current level will automatically restore the output voltage of the generator to the desired level. Again, it should be noted that the effect which increases in the current flowing through the primary winding of current transformer 70 has upon the value of the current flowing through the base-emitter circuit of transistor 189 is very small compared to the effect which increases in the voltages across rheostat 142 and potentiometer 144 have upon that value.

If the stator voltage of the generator tended to decrease or increase abruptly and substantially, the current flowing through series-connected resistors 174 and 178, the base-emitter circuit of transistor 189, resistor 182, and potentiometer 159 also would tend to change abruptly and substantially. Such abrupt and substantial changes in that current would abruptly and substantially change the conductivity of transistor 189—with a consequent abrupt and substantial change in the conductivity of transistor 191, and with an abrupt and substantial change in the firing angles of unijunction transistor 197 and of controlled rectifier 52. Any such changes in those firing angles could abruptly and substantially change the current flowing through the field winding 64, and thus cause the output voltage of the generator to "hunt." All such "hunting" of that output voltage would be very objectionable; and all such "hunting" is obviated by the use of capacitor 184 and resistor 178.

Specifically the capacitor 184 is connected in parallel with series-conected resistor 178 and the base-emitter circuit of transistor 189; and that capacitor will act as a low resistance conductor for any abrupt and substantial increase in current passing through the junction 183—and hence will largely by-pass those increases in current around the base-emitter circuit of transistor 189. The by-passing of those abrupt and substantial increases around that base-emitter circuit obviates an abrupt and substantial increase in the conductivity of that transistor, and thereby avoids an abrupt and substantial shift in the firing angles of unijunction transistor 197 and of controlled rectifier 52. If the current flowing past junction 183 tends to remain at its increased level, the capacitor 184 will charge until substantially all of the current flowing past junction 183 will flow through series-connected resistor 178 and the base-emitter circuit of transistor 189. The resulting increase in the conductivity of that transistor will permit more current to flow through resistor 182; and the consequent increase in the current flowing through that resistor will make the base of transistor 191 more positive with respect to the emitter of that transistor. As the conductivity of the transistor 191 then increases, the firing angles of the unijunction transistor 197 and of the controlled rectifier 52 will shift toward the end of each cycle of the generator, thereby causing the output voltage of the generator—and hence the current flowing through the base-emitter circuit of transistor 189—to fall to its normal value.

Conversely, if the current flowing through the series-connected resistor 178 and the base-emitter circuit of transistor 189 tended to decrease abruptly and substantially, the capacitor 184 would tend to sustain the voltage across that series-connected resistor and base-emitter circuit; and would thereby tend to sustain the current flowing through that series-connected resistor and base-emitter circuit. As a result, the conductivity of that transistor would not decrease sharply, and hence the firing angles of unijunction transistor 197 and of controlled rectifier 52 would not abruptly shift toward the beginning of each electrical cycle of the generator. If the current flowing through the series-connected resistor 178 and the base-emitter circuit of transistor 189 tended to remain at its reduced level, the capacitor 184 would discharge through that series-connected resistor and base-emitter circuit; and, as that capacitor discharged, the voltage across it and the current flowing through series-connected resistor 178 and the base-emitter circuit of transistor 189 would decrease. Thereupon, the conductivity of that transistor would decrease; and that decrease in conductivity would permit less current to flow through resistor 182, thereby making the base of transistor 191 less positive with respect to the emitter of that transistor. The resulting decrease in conductivity of transistor 191 would enable capacitor 194 to shift the firing angles of unijunction transistor 197 and of controlled rectifier 52 toward the beginning of each electrical cycle of the generator, thereby causing the output voltage of the generator—and hence the current flowing through series-connected resistor 178 and the base-emitter circuit of transistor 189 to rise to its normal value.

The resistive value of the resistor 178 will help determine the rate at which the capacitor 184 can discharge; and will thus help determine the length of time that is required for the effect of a decrease in voltage across the series-connected resistor 178 and the base-emitter circuit of transistor 189 to fully change the conductivity of that transistor. Similarly, the capacitive value of the capacitor 184 will help determine the rate at which that capacitor can charge, and will thus help determine the length of time that is required for the effect of an increase in the voltage across the series-connected resistor 178 and the base-emitter circuit of transistor 189 to fully change the conductivity of that transistor. The diode 187 is useful in making certain that current cannot flow from junction 181 through the base-emitter circuit of the transistor 189. The over-all result is that overshooting and undershooting of the firing angles of unijunction transistor 197 and of controlled rectifier 52 are prevented; and this is very desirable, because it stabilizes the operation of the generator and of the combination exciter-regulator therefor.

The combination exciter and regulator provided by the present invention should permit the voltages across the phases 22 and 24 to drop momentarily in the event the generator has its full load suddenly applied to it; because such a momentary drop would sharply reduce the load on the prime mover, and thereby enable that prime mover to quickly raise the speed of the rotor to the value which it had before that load was suddenly applied. However, that combination exciter and regulator should not permit the voltage across the series-connected rheostat 142 and potentiometer 144 to drop even momentarily in the event the generator has its full load suddenly applied to it; because such a momentary drop would change the biasing current through the base-emitter circuit of transistor 189, and thereby change the "on" time of the controlled rectifier 52. Yet, that combination exciter and regulator must permit selective adjustment of the movable contact of potentiometer 144 to change the biasing current through the base-emitter circuit of transistor 189, and thus adjust the "on" time of the controlled rectifier 52; because the adjustment of that "on" time is needed to vary the output voltage of the generator. The combination exciter and regulator of the present invention makes it possible for the voltages across the phases 22 and 24 to drop momentarily, and for the voltages across the series-connected rheostat 142 and potentiometer 144 to remain substantially unchanged, when the generator has its full load suddenly applied to it, and it also makes it possible for adjustment of the movable contact of potentiometer 144 to adjust the biasing current through series-connected resistor 178 and the base-emitter circuit of transistor 189; and it does so by providing the reactor 120 with a very large inductance and by connecting that reactor in series with the potentiometer 144. The inductance of reactor 120 is so large, compared to the maximum resistance of rheostat 142 and to the resistance of potentiometer 144, that the effective impedance of the sub-circuit which includes that rheostat, that potentiometer and the reactor 120 is the inductive reactance of that reactor. The current that flows through that sub-circuit will be the voltage between tap 25 and the neutral terminal 27 divided by the impedance of that sub-circuit, and will effectively be the voltage between tap 25 and the neutral terminal 27 divided by the inductive reactance of the reactor 120. Both that voltage and that inductive reactance will be a function of the frequency of the alternating current generated by the generator. This means that the frequency of the alternating current generated by the generator is in both the numerator and denominator of the equation that determines the value of the current flowing through the sub-circuit which includes rheostat 142, potentiometer 144, and reactor 120; and hence that frequency can be cancelled. The overall result is that the said sub-circuit is substantially insensitive to changes in the frequency of the alternating current generated by the generator, and is thus substantially insensitive to changes in the speed of the rotor of that generator. Consequently the combination exciter and regulator provided by the present invention enables an abrupt drop in the speed of the rotor of the generator to produce an abrupt, momentary drop in the output voltage of that generator, but keeps the current flowing through rheostat 142, potentiometer 144, and reactor 120 substantially unchanged. Yet, that combination exciter and regulator enables the biasing current through series-connected resistor 179 and the base-emitter circuit of transistor 189 to be adjusted at will, as by adjustment of the position of the movable contact of potentiometer 144, to change the "on" time of the controlled rectifier 52—with a consequent change in the output voltage of the generator.

The combination exciter and regulator provided by the present invention permits the voltages across the phases 22 and 24 to rise momentarily, in the event the greatest part of the load is suddenly disconnected from the generator; and this is desirable because it enables the prime mover to quickly reduce the speed of the rotor to the value which it had before that part of the load was suddenly disconnected. Yet, that combination exciter and regulator keeps the voltage across the series-connected rheostat 142 and potentiometer 144 substantially unchanged, even though the greatest part of the load is suddenly disconnected from the generator. The overall result is that the "on" time of the controlled rectifier 52 remains substantially unchanged, but the output voltage of the generator momentarily increases the load on the prime mover, thereby slowing that prime mover, and the rotor of the generator, down to the desired speed.

The momentary decrease in generator output voltage, that occurs whenever the load on the generator increases abruptly and substantially, enables the prime mover to quickly raise the speed of the generator rotor back up to the desired level. Usually, that speed will be raised back up to the desired level within a few cycles of the output voltage; and, as that speed returns to its desired level, the generator output voltage also will return to its desired level. The momentary increase in generator output voltage, that occurs whenever the load on the generator decreases abruptly and substantially, enables the prime mover to quickly let the speed of the generator rotor fall to the desired level. Usually, that speed will fall to the desired level within a few cycles of the output voltage; and, as that speed returns to its desired level, the generator output voltage also will return to its desired level. The overall result is that the speed of the rotor of the generator and the output voltage of that generator will quickly return to their desired values even though the load has been abruptly and substantially changed.

The total length of time during which the output voltage of the generator is reduced or increased will be quite short, and hence that reduction or increase in output voltage will not be objectionable. However, that reduction or increase in output voltage is invaluable in causing the prime mover to quickly restore the speed of the rotor of the generator to the desired value. The combination exciter-regulator of the present invention thus enables the generator to successfully accommodate sudden applications of loads which could otherwise tend to "block" that generator and the prime mover therefor.

The current transformer 70 senses the current which flows through the phase 24; and that current transformer is designed so the current which flows through the secondary winding thereof is approximately one hundred and eighty degrees out of phase with the current which flows through the primary winding thereof. This means that the voltage which is developed across the potentiometer 150 will be approximately one hundred and eighty degrees out of phase with the current which flows through phase 24.

On the other hand, the current which flows from tap 25 of phase 24 via junction 68, reactor 120, junction 136, rheostat 142, and potentiometer 144 to the neutral terminal 27, is only ninety degrees out of phase with the voltage across phase 24. This is due to the fact that the reactance of reactor 120 is sufficiently large, compared to the resistance of rheostat 142 and potentiometer 144, to cause the current to be ninety degrees out of phase with the voltage. The voltage which is applied to the primary winding 126 of isolation transformer 124 is the sum of the voltages across rheostat 142, the lower section of potentiometer 144, and the left-hand section of potentiometer 150; and thus is the resultant of two voltages—one across rheostat 142 and the lower section of potentiometer 144 and the other across the left-hand section of potentiometer 150. The voltage acros the left-hand section of potentiometer 150 is proportional to the current flowing in phase 24, whereas the voltage across rheostat 142 and the lower section of potentiometer 144 is proportional to the voltage across that phase.

Whenever two or more generators, which are driven by variable speed prime movers, have the outputs thereof connected in parallel, it is desirable to force the various prime movers to share the active power and to force the various generators to share the reactive power. If the prime movers have linear, decreasing, speed-torque characteristics, the distribution of the active power between those prime movers can be adjusted by proper settings of speed-regulating governors which control the throttles of those prime movers; and the active—unity power factor—currents will automatically be shared by the generators. The sharing of the reactive power by the various generators can be controlled by controlling the excitation of those generators; and the subcircuits—one of which includes current transformer 70 and potentiometer 150, and the other of which includes reactor 120, rheostat 142 and potentiometer 144—of the combination exciter-regulator of the present invention enable that combination exciter-regulator to cause the generator, with which it is used, to assume its proper share of the reactive power.

Thus, if the excitation of the generator with which the combination exciter-regulator of the present invention is used were to increase, the output voltage of that generator would automatically tend to increase. If that generator was operating in parallel with another generator, and if no cross current compensation was provided, that increased output voltage could cause the regulator of that other generator to reduce the excitation of that other generator. If the rating of the generator was not large enough to affect the output voltage, the excitation could increase without a corresponding change in output voltage. In either case, the generator, with which the combination exciter-regulator of the present invention is used, would have to provide more than its proportionate share of the reactive current for the load. However, because the combination exciter-regulator provided by the present invention is equipped with the sub-circuit consisting of current transformer 70 and potentiometer 150, is equipped with the sub-circuit consisting of reactor 120, rheostat 142 and potentiometer 144, and has the movable contacts of those potentiometers connected together, an increase in the current flowing in phase 24, due to the increased excitation of the generator, will increase the voltage across potentiometer 150.

Specifically, the voltage across potentiometer 150 is one hundred and eighty degrees out of phase with the current flowing through phase 24, whereas the voltage across rheostat 142 and the lower section of potentiometer 144 is ninety degrees out of phase with the voltage across that phase. Whenever the current flowing through phase 24 is in phase with the voltage across that phase—as at unity power factor—the voltage across potentiometer 150 will be ninety degrees out of phase with the voltage across rheostat 142 and the lower section of potentiometer 144. Because the voltage across potentiometer 150 is small compared to the voltage across rheostat 142 and the lower section of potentiometer 144, the resultant voltage across the primary winding 126 of transformer 124—at unity power factor—will not be significantly different from the voltage across rheostat 142 and the lower section of potentiometer 144. This means that when the power factor is unity or close to unity, variations in the current flowing through phase 24 can not have much effect upon the voltage across the primary winding 126 of transformer 124, and thus can not have much effect upon the firing angle of the controlled rectifier 52. However, when the generator of the present invention and one or more generators with which it is coupled are not sharing the reactive load, a lagging power factor will usually exist; and such a power factor will increase the resultant of the voltage across potentiometer 150 and of the voltage across rheostat 142 and the lower section of potentiometer 144. In such event, the increase in voltage across potentiometer 150 would perceptibly increase the resultant voltage applied to the primary winding 126 of transformer 124, thereby increasing the induced voltage in the secondary winding 128 of that transformer; and the resulting increase in the current flowing through series-connected resistor 178 and the base-emitter circuit of transistor 189 will increase the conductivity of that transistor. More current will then flow through the collector-emitter circuit of that transistor and through resistor 182, thereby making the base of transistor 191 more positive with respect to the emitter of that transistor. The resulting increase in conductivity of transistor 191 will reduce the percentage of current, flowing through the resistor 192, which will flow through the capacitor 194; and, as a result, that capacitor will take longer to charge, and will thereby shift the firing angles of unijunction transistor 197 and of controlled rectifier 52 closer to the end of each cycle of the generator. The resulting shorter-duration voltage pulses in FIG. 3 will cause the current flowing through the field winding 64 to decrease, and will thus cause the output voltage of the generator to tend to remain at the desired level, and will also produce a corresponding reduction in reactive current flowing through phases 22, 24 and 26. The resulting holding of the output voltage of the generator at the desired level will keep the regulator of the other generator from reducing the excitation of that other generator; and will thereby enable both generators to provide their proportionate shares of the reactive current for the load.

If the excitation of the generator with which the combination exciter-regulator of the present invention is used were to decrease, the output voltage of that generator would automatically tend to decrease. If that generator was operating in parallel with another generator, and if no cross current compensation was provided, that decreased output voltage could cause the regulator of that other generator to increase the excitation of that other generator. If the rating of the generator was not large enough to affect the output voltage, the excitation could decrease without a corresponding change in output voltage. In either case, the generator, with which the combination exciter-regulator of the present invention is used, would be providing less than its proportionate share of the reactive current for the load. However, because the combination exciter-regulator provided by the present invention is equipped with the sub-circuit consisting of current transformer 70 and potentiometer 150, is equipped with the sub-circuit consisting of reactor 120, rheostat 142 and potentiometer 144, and has the movable contacts of those potentiometers connected together, a decrease in the current flowing in phase 24, due to the decreased excitation of the generator will decrease the voltage across potentiometer 150. That decrease will perceptibly decrease the resultant voltage applied to the primary winding 126 of transformer 124, thereby decreasing the induced voltage in the secondary winding 128 of that transformer; and the resulting decrease in the current flowing through series-connected resistor 178 and the base-emitter circuit of transistor 189 will decrease the conductivity of that transistor. Less current will then flow through the collector-emitter circuit of that transistor and through resistor 182, thereby making the base of transistor 191 less positive with respect to the emitter of that transistor. The resulting decrease in conductivity of transistor 191 will increase the percentage of current, flowing through the resistor 192, which will flow through the capacitor 194; and, as a result, that capacitor will take less time to charge, and will thereby shift the firing angles of unijunction transistor 197 and of controlled rectifier 52 closer to the beginning of each cycle of the generator. The resulting longer-duration voltage pulses in FIG. 3 will cause the current flowing through the field winding 64 to increase, and will thus cause the output voltage of the generator to tend to remain at the desired level, and will also produce a corresponding reduction in reactive current flowing through phases 22, 24 and 26. The resulting holding of the output voltage of the generator at the desired level will keep the regulator of the other generator from increasing the excitation of that other generator; and will thereby enable both generators to provide their proportionate shares of the reactive current for the load.

It will be noted that the current which flows through the resistor 182 to bias the transistor 191 also flows, in part, through the resistor 58; and that current then flows via junction 59, field winding 64, and junction 65 to the neutral terminal 27. The polarity of the voltage across the resistor 58 is the same as the polarity of the voltage across the resistor 182; and any increases in the voltage across resistor 58 will reduce the available voltage across the resistor 182—with a consequent reduction in the positive biasing of transistor 191. This means that whenever the current flowing through the field winding 64 increases, as for example when the load is increased, the transistor 191 will become less conductive and will force the percentage of current, flowing through resistor 192 and capacitor 194, to increase. The charging time of that capacitor will decrease, and the resulting shifting of the firing angles of unijunction transistor 197 and of controlled rectifier 52 toward the beginning of each cycle of the generator will increase the "on" time of the controlled rectifier 52—thereby further increasing the current flowing through the field winding 64, and thereby increasing the output voltage of the generator. Such a compounding action is desirable, because it enables the output voltage of the generator to stay close to the desired level even though the load on the generator increases rapidly. By appropriately selecting the value of the resistor 58, it is possible to provide positive voltage regulation, to provide zero voltage regulation, or to provide negative voltage regulation for the generator. Adjustment of the effective value of resistor 58 can be accomplished by means of the potentiometer 159 which is connected in parallel with that resistor. The resistance of the potentiometer 159 should be high compared to the resistance of resistor 58.

Essentially, the combination exciter-regulator disclosed by FIG. 1 uses the Zener diode 199 to establish a standard reference voltage across resistor 188, and then compares the voltage across resistor 180 with that standard reference voltage. The voltage across resistor 180 is a function of the output voltage of the generator, because of the sub-circuit which includes reactor 120, rheostat 142, and potentiometer 144, and also is a function of the current flowing through phase 24 of that generator, because of the sub-circuit which includes current transformer 70 and potentiometer 150; and hence a change in that output voltage, or a change in that current, will change the voltage across resistor 180. The amplification provided by the transistors 189 and 191 will enable that change in voltage across resistor 180 to cause a substantial change in the amount of current shunted around the capacitor 194; and the resulting change in the charging time of that capacitor will change the "on" time of controlled rectifier 52, and will thereby change the excitation of the generator to compensate for the said change in the output voltage or the said change in the current flowing through phase 24.

The combination exciter-regulator provided by the present invention has three adjustments which can be made by the operator of the generator. Adjustment of the movable contact of potentiometer 150 will adjust the effect which a change in the current flowing through phase 24 will have upon the voltage across resistor 180. That adjustment makes it possible for the generator, with which the combination exciter-regulator of the present invention is used, to properly share the reactive load with a parallel-connected generator. Adjustment of the movable contact of potentiometer 144 will adjust the output voltage of the generator for any given rotor speed and load. Adjustment of the movable contact of the potentiometer 159 will adjust the gain of the regulating portion of the combination exciter-regulator.

It will be noted that the sub-circuit which includes current transformer 70 and potentiometer 150, and which provides cross current compensation, changes the output voltage of the generator by changing the conductivities of the transistors 189 and 191, and thereby changing the charging time of capacitor 194. Similarly, it will be noted that the sub-circuit which includes reactor 120, rheostat 142, and potentiometer 144, and which responds to incipient changes in the stator voltage to hold that stator voltage substantially constant, changes the output voltage of the generator by changing the conductivities of the transistors 189 and 191, and thereby changing the charging time of capacitor 194.

The combination exciter-regulator provided by the present invention works equally well with generators that are driven by constant speed prime movers and with generators that are driven by variable speed prime movers. As a result, that combination exciter-regulator is very versatile.

With the exception of the relay contacts 49 and 67, all components of the combination exciter-regulator of the present invention are static. This is very desirable, because it substantially frees that combination exciter-regulator from problems due to sticking of contacts and from problems due to mechanical and electrical inertia or momentum.

The recurrent "firing" and extinguishing of the controlled rectifier 52 causes discrete voltage pulses to be applied to the field winding 64, as shown by FIG. 3; and those voltage pulses can produce static and noise in radio and communication receivers that are located adjacent the generator. The intensity of that static and noise is materially lessened by choke 40 and capacitor 39, by choke 76 and capacitor 75, by choke 88 and capacitor 87, and by capacitor 41.

Figure 8:
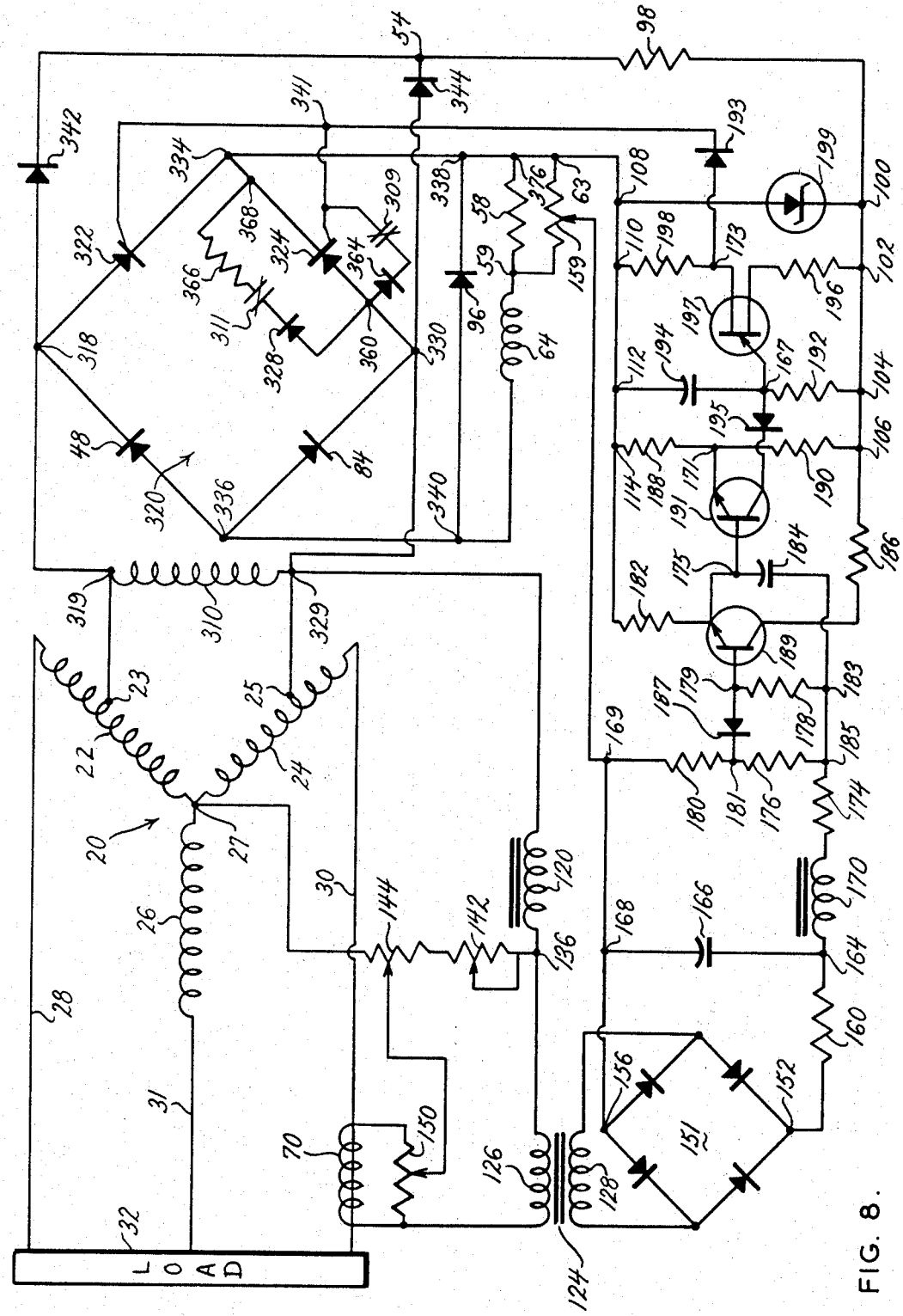
FIG. 8 is a schematic diagram of a second form of combination exciter and regulator that is made in accordance with the principles and teachings of the present invention.

Control system of FIG. 8

FIG. 8 discloses a combination exciter-regulator which is generally similar to the combination exciter-regulator disclosed by FIG. 1; and most of the components of the combination exciter-regulators disclosed by FIGS. 1 and 8 are identical and perform the same functions. However, the combination exciter-regulator of FIG. 8 differs from the combination exciter-regulator of FIG. 1 in using two controlled rectifiers 322 and 324 instead of the controlled rectifier 52. Furthermore, those controlled rectifiers are two of the four legs of a full wave bridge rectifier 320; and the other two legs of that bridge rectifier are power rectifiers 48 and 84, and those power rectifiers can be identical to the similarly-numbered power rectifiers in FIG. 1. The input terminal 318 of the bridge rectifier 320 is connected to the tap 23 by a junction 319; and input terminal 330 of that bridge rectifier is connected to the tap 25 by a junction 329. A diode 328, normally-closed relay contacts 311, and a resistor 366 are connected in series between the anode and cathode of the controlled rectifier 324. A diode 364 and normally-closed relay contacts 309 are connected in series between the anode and gate of the controlled rectifier 324. A relay coil 310 is connected between the junctions 319 and 329, and that relay coil will open the relay contacts 309 and 311 and then hold them open after the voltage between junctions 319 and 329 rises to a predetermined level.

Output terminal 334 of the bridge rectifier 320 is connected to the right-hand terminal of the field winding 64 by junctions 338, 376, a resistor 58, and junction 59; and output terminal 336 of that bridge rectifier is connected to the left-hand terminal of that field winding by a junction 340. Discharge diode 96 has the anode thereof connected to the left-hand terminal of the field winding 64 by the junction 340, and has the cathode thereof connected to the right-hand terminal of that field winding by junctions 338 and 376, resistor 58 and junction 59.

The tap 23 is connected to junction 54 by junctions 319 and 318, and diode 342. The tap 25 is connected to junction 54 by junctions 329 and 330 and diode 344. The junction 54 is connected to the junctions 100, 102, 104 and 106 by the resistor 98. The gates of the controlled rectifiers 322 and 324 are connected together and to the cathode of diode 193 by a junction 341. The junction 329 is connected to the right-hand terminal of reactor 120.

A potentiometer 159 is connected in parallel with the resistor 58 by junction 59 and by junctions 63 and 376. Junctions 108, 110, 112 and 114 are directly connected to the junction 63. The movable contact of potentiometer 159 is connected to the junction 169.

With the combination exciter-regulator of FIG. 1, the stator winding 20 of the generator can only apply voltage to the field winding 64 for less than three hundred degrees during each cycle of the alternating current generated by the generator; because that field winding is connected between the tap 23 of phase 22 and the neutral terminal 27 and also is connected between tap 25 of phase 24 and that neutral terminal. However, the field winding 64 of the combination exciter-regulator of FIG. 8 can, if desired, have voltage applied to it throughout the greatest part of each cycle of the alternating current generated by the generator.

When the prime mover starts rotating the rotor of the generator of FIG. 8, the residual magnetic flux of that generator will cause voltages to develop successively across the phases 22, 24 and 26. During those portions of the first revolutions of the rotor of that generator, wherein the voltage at tap 25 is positive relative to the voltage at tap 23, current will flow from tap 25 via junction 329, relay coil 310, and junction 319 to the tap 23. However, the voltage from tap 25 to tap 23 will initially be quite low; and hence the current flowing through the relay coil 310 will initially be too low to enable that coil to open the contacts 311 and 309. Current also will flow from tap 25 via junction 329, input terminal 330, junction 360, diode 328, still-closed relay contacts 311, resistor 366, junction 368, output terminal 334, junctions 338 and 376, resistor 58, junction 59, field winding 64, junction 340, output terminal 336, power diode 48, input terminal 318, and junction 319 to the tap 23. The resulting flow of current through the field winding 64 will cause that field winding to increase the output voltage of the generator. Current also will flow from tap 25 via junctions 329 and 330, diode 344, junction 54, resistor 98, junction 100, five of the six parallel-connected current paths to junction 108, junctions 63 and 376, resistor 58, junction 59, field winding 64, junction 340, output terminal 336, power rectifier 48, input terminal 318, and junction 319 to the tap 23. The flow of current through Zener diode 199 will tend to raise the voltage drops across that Zener diode to the rated voltage drops of that Zener diode. Current will additionally flow from tap 25 via reactor 120, junction 136, rheostat 142, and potentiometer 144 to the neutral terminal 27. Moreover, current will flow from the outer terminal of phase 24 via conductor 30, the primary winding of current transformer 70, the lower part of load 32, and conductor 31 to the outer terminal of phase 26.

During other portions of the first revolutions of the rotor of the generator, current will flow from the outer terminal of phase 26 via conductor 31, the lower part of load 32, the primary winding of current transformer 70, and conductor 30 to the outer terminal of phase 24. Also, current will flow from the outer terminal of phase 26 via conductor 31, the upper part of load 32, and conductor 28 to the outer terminal of phase 22.

During still other portions of the first revolutions of the rotor of the generator, current will flow from tap 23 via junction 319, relay coil 310, and junction 329 to the tap 25; but that current will be too small to cause the coil 310 to open the relay contacts 309 and 311. Current will be unable to flow from tap 23 via junction 319, input terminal 318, controlled rectifier 322, output terminal 334, junctions 338, and 376, resistor 58, junction 59, field winding 64, junction 340, output terminal 336, power rectifier 84, input terminal 330, and junction 329 to the tap 25; because the controlled rectifier 322 will still be non-conductive. However, current will flow from tap 23 via junctions 319 and 318, diode 342, junction 54, resistor 98, junction 100, five of the six parallel-connected paths to junction 108, junctions 63 and 376, resistor 58, junction 59, field winding 64, junction 340, output terminal 336, power rectifier 84, input terminal 330, and junction 329 to the tap 25. That current will cause the voltage drops across the Zener diode 199 to approach the rated voltage drops of that Zener diode. Current additionally will flow from the outer terminal of phase 22 via conductor 28, the upper part of load 32, and conductor 31 to the outer terminal of phase 26.

With each revolution of the rotor of the generator, the voltage between taps 23 and 25 will increase; and hence the current flowing through relay coil 310 will increase. Also, the voltage between junctions 100 and 108 will increase to the point where capacitor 194 will be able to charge sufficiently to "fire" the unijunction transistor 197. Thereafter, the value of the current flowing through the relay coil 310 will increase to the point where the relay contacts 309 and 311 will open and then remain open. During one half of each succeeding cycle of the generator, the voltage at junction 318 will be positive relative to the voltage at junction 330; and, as the capacitor 194 "fires" the unijunction transistor 197 and causes "firing" signals to be applied to the controlled rectifiers 322 and 324, the former controlled rectifier will become conductive and cause current to flow through resistor 58 and field winding 64. During the other half of each succeeding electrical cycle of the generator, the voltage at junction 330 will be positive relative to the voltage at junction 318; and, as the capacitor 194 "fires" the unijunction transistor 197 and causes "firing" signals to be applied to the controlled rectifiers 322 and 324, the latter controlled rectifier will become conductive and cause current to flow through resistor 58 and field winding 64. The controlled rectifier 322 will be non-conductive at the beginning of each cycle of the generator, will be "fired" during the first half of that cycle, and will be extinguished at the beginning of the next half of that cycle by the application of a reverse voltage across it. The controlled rectifier 324 will be non-conductive at the beginning of the second half of each cycle of the generator, will be "fired" during that second half of that cycle, and will be extinguished at the beginning of the next cycle by the application of a reverse voltage across it.

The conductivity of the transistor 191 will determine the charging time of the capacitor 194, in the manner described hereinbefore, and will thus determine the "on" time of the controlled rectifiers 322 and 324. The conductivity of that transistor will be controlled by the current flowing through phase 24 and through the primary winding of current transformer 70, and by the output voltage of the generator, all as described hereinbefore.

During those portions of any given cycle of the alternating current generated by the generator wherein neither of the controlled rectifiers 322 and 324 is conductive, the inductive energy within the field winding 64 will force current to flow from the left-hand terminal of that field winding via junction 340, discharge diode 96, and junctions 338 and 376, resistor 58, and junction 59 to the right-hand terminal of that field winding. As a result, that field winding will have current flowing through it continuously, even though that field winding receives voltage in the form of discrete voltage pulses.

Adjustment of the movable contact of the potentiometer 144 of FIG. 8 will establish a normal "on" time for each of the controlled rectifiers 322 and 324; and the field winding 64 will respond to the resulting current flow therethrough to develop a desired output voltage for the generator. In the event that output voltage tends to rise or fall, the sub-circuit which includes reactor 120, rheostat 142, potentiometer 144, current transformer 70 and potentiometer 150, transformer 124, bridge rectifier 151, series-connected resistor 178 and the base-emitter circuit of transistor 189, and resistor 182 will vary the conductivity of transistor 191 and thereby change the charging time of the capacitor 194. The resulting shifting of the firing angles of unijunction transistor 197 and of controlled rectifiers 322 and 324 will hold the output voltage of the generator at substantially the desired level; all as described hereinbefore in connection with the operation of the combination exciter-regulator of FIG. 1. The sub-circuit which includes rheostat 142, potentiometer 144, current transformer 70, potentiometer 150, transformer 124, bridge rectifier 151, series-connected resistor 178 and the base-emitter circuit of transistor 189 and resistor 182 will provide cross current compensation, all as described hereinbefore in connection with the operation of the combination exciter-regulator of FIG. 1.

The theory and operation of the combination exciter-regulator of FIG. 8 are substantially the same as the theory and operation of the combination exciter-regulator of FIG. 1. However, the combination exciter-regulator of FIG. 8 supplies better-balanced voltage pulses to the field winding 64 than does the combination exciter-regulator of FIG. 1; because the former combination exciter-regulator supplies at least one voltage pulse during each half-cycle of the alternating current generated by that generator whereas the latter combination exciter-regulator need not.

Figure 9:
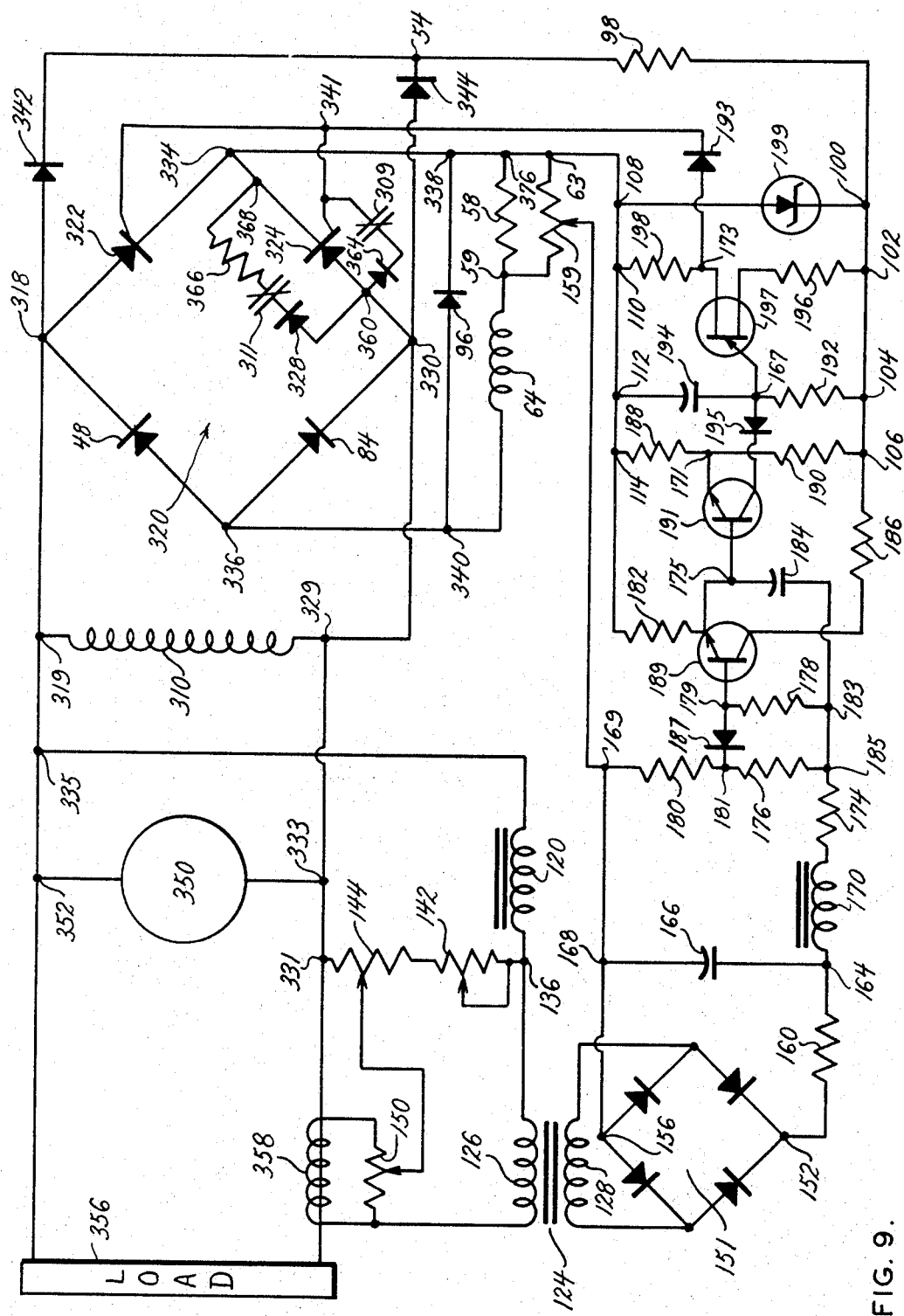
FIG. 9 is a schematic diagram of a third form of combination exciter and regulator that is made in accordance with the principles and teachings of the present invention.

*Control system of FIG. 9*

Where desired, a combination exciter-regulator which embodies the principles and teachings of the present invention can be provided for a single phase alternator. Thus, as shown by FIG. 9, the upper terminal of a single phase alternator 350 can be connected to the upper terminal of a load 356 by a junction 352, can be connected to the upper terminal of relay coil 310 by junctions 352, 335 and 319, and can be connected to the right-hand terminal of reactor 120 by junctions 352 and 335. In addition, that upper terminal can be connected to the input terminal 318 of bridge rectifier 320, and to the anode of diode 342 by the junctions 352, 335, 319 and 318. The lower terminal of that single phase alternator can be connected to the lower terminal of the load 356 by junctions 333 and 331 and the primary winding of a current transformer 358. That lower terminal of that alternator can be connected to the lower terminal of relay coil 310, to the input terminal 330 of bridge rectifier 320, and to the anode of diode 344 by junctions 333 and 329. That lower terminal of that alternator also is connected to the upper terminal of potentiometer 144 by junctions 333 and 331.

The secondary winding of current transformer 358 is connected to the terminals of potentiometer 150; and that current transformer can be identical to the current transformer 70 of FIG. 8.

Whenever the alternator 350 of FIG. 9 is operating under normal conditions, a voltage pulse will be supplied to the field winding of that alternator during each half-cycle of that alternator. The durations of those voltage pulses will be functions of the conductivity of the transistor 191; and that conductivity will be a function of the setting of the movable contact of potentiometer 144, of the current flowing through the primary winding of current transformer 358, and of the voltage between junctions 333 and 335 in much the same way in which the conductivities of the transistors 191 in FIGS. 1 and 8 are functions of the settings of the movable contacts of potentiometer 144, of the currents flowing through the primary windings of current transformers 70, and of the voltages between taps 23 and 25.

*Modifications*

If desired, chokes and capacitors, similar to the chokes 40, 76 and 88 and similar to the capacitors 39, 75, 87 and 41 of FIG. 1, could be added to the combination exciter-regulator of FIGS. 8, 9, 13 and 14. Those chokes and capacitors would minimize the effect which the generator would have upon nearby radio and communication receivers.

If desired, the bridge rectifier 320 of FIG. 8 could be connected between the tap 23 and the neutral terminal 27 of FIG. 8, or could be connected between the tap 25 and that neutral terminal, instead of being connected between those taps.

If desired, a combination exciter-regulator for a three phase generator could be provided with three controlled rectifiers and a separate firing circuit for each controlled rectifier. While such a combination exciter-regulator would supply well-balanced voltage pulses to the field winding of that generator, such a combination exciter-regulator would be quite expensive.

The drawing and accompanying description have shown and described combination exciter-regulators for three phase and single phase generators, but combination exciter-regulators which embody the principles and teaching of the present invention could be provided for generators which generate two phase or polyphase alternating current. Further, the combination exciter-regulator of the present invention could be used with a brushless generator, as by having that combination exciter-regulator control the field current of the exciter of that generator. In addition, that combination exciter-regulator could be used with a separately excited generator, as by connecting the junctions 34 and 72 of FIG. 1 to two line conductors and by connecting the junction 65 of FIG. 1 to the neutral conductor of a three phase source.

Whereas the drawing and accompanying description have shown and described preferred embodiments of the present invention it should be apparent to those skilled in the art that various changes may be made in the form of the invention without affecting the scope thereof.

What I claim is:

1. A combination exciter-regulator for an alternating current generator, which has a stator winding and a rotatable field winding, that comprises:

(a) a controlled rectifier in the excitation circuit of said field winding of said generator, (b) a sub-circuit that can vary the "on" time of said controlled rectifier and thereby vary the excitation of said generator, (c) a second sub-circuit that is responsive to the voltage generated by said generator and that responds to some incipient increases in said voltage to develop an increased voltage drop across a portion thereof to cause the first said sub-circuit to decrease the "on" time of said controlled rectifier and thereby hold the output voltage of said generator at substantially the desired level and that responds to some incipient decreases in said voltage to develop a decreased voltage drop across said portion thereof to cause the first said sub-circuit to increase the "on" time of said controlled rectifier and thereby hold the output voltage of said generator at substantially the desired level, (d) a third sub-circuit that can respond to increases in the current drawn from said generator to cause the first said sub-circuit to reduce the "on" time of said controlled rectifier and thereby maintain the output voltage of said generator at substantially the desired level and that can respond to decreases in the current drawn from said generator to cause the first said sub-circuit to increase the "on" time of said controlled rectifier and thereby maintain the output voltage of said generator at substantially the desired level, (e) said second sub-circuit having another portion thereof responsive to the frequency of the voltage generated by said generator, and hence to the speed of the rotor of said generator, (f) said other portion of said second sub-circuit responding to a change in frequency of the voltage generated by said generator to change its effective impedance and hence the overall effective impedance of said second sub-circuit, (g) the effective impedance of said other portion of said second sub-circuit responding to a change in frequency of the voltage generated by said generator at about the same rate at which said voltage responds to a change in said frequency, so the current flowing through the first said portion of said second sub-circuit will be substantially unaffected by changes in the frequency of the voltage generated by said generator, and hence in the speed of the rotor of said generator, (h) whereby said second sub-circuit can respond to those incipient changes in the voltage generated by said generator which are not due to changes in frequency to develop a change in the voltage drop across the first said portion thereof and cause the first said sub-circuit to change the "on" time of said controlled rectifier and thereby hold the output voltage of said generator at substantially the desired level, and (i) whereby said second sub-circuit permits changes in frequency to substantially change the output voltage of said generator, (j) the first said portion of said second sub-circuit being resistive, (k) said other portion of said second sub-circuit being inductive, (l) said other portion of said second sub-circuit having an effective impedance that is much greater than the effective impedance of the first said portion of said second sub-circuit, (m) whereby the impedance of said second sub-circuit is essentially inductive in nature, (n) said second sub-circuit and said third sub-circuit being interconnected to each other and to the first said sub-circuit to enable either or both said second sub-circuit and said third sub-circuit to cause the first and sub-circuit to vary the "on" time of said controlled rectifier, (o) said generator being a polyphase generator, (p) said controlled rectifier and said field winding being connected to two phases of said generator to receive a two phase voltage, whereby said controlled rectifier can become non-conductive during each cycle of said generator, (q) the first said sub-circuit including a Zener diode that can establish a predetermined voltage across a series-connected resistor and transistor, and also including a rectifier that supplies direct current to said resistor and to the base-emitter circuit of said transistor, (r) said direct current from said rectifier varying with variations in the voltage across the first said portion of said second sub-circuit and also varying with changes in the current drawn from said generator to change the conductivity of said transistor, and thereby change the voltage across said resistor, (s) a second transistor, having said resistor connected between the base and emitter thereof, that controls the firing angle of said controlled rectifier, (t) said predetermined voltage across said resistor providing a predetermined conductivity for said second transistor, and thereby providing a predetermined firing angle for said controlled rectifier, (u) said second transistor responding to changes in the voltage across said resistor to change the firing angle of said controlled rectifier, (v) said second transistor providing an amplifying action so that small variations in the voltage across the first said portion of said second sub-circuit and small changes in the current drawn from said generator cause appreciable changes in the firing angle of said controlled rectifier, and thus cause appreciable changes in the output voltage of said generator, (w) a second resistor connected in series with said field winding, (x) said second resistor being connected to the first said resistor so the voltages across said resistors have the same polarities and are additive and so an increase in the voltage across said second resistor will decrease the voltage across the first said resistor and will thus cause said second transistor to increase the firing angle of said controlled rectifier, (y) whereby said second resistor and the first said resistor provide a compounding action, (z) a resistance-capacitance network connected to the first said transistor to keep abrupt variations in the voltage across the first said portion of said second sub-circuit and to keep abrupt changes in the current drawn from said generator from abruptly changing the conductivity of the first said transistor, (aa) whereby abrupt variations in the voltage across the first said portion of said second sub-circuit and abrupt changes in the current drawn from said generator can not abruptly change the firing angle of said controlled rectifier, (ab) power rectifiers connected in series with said controlled rectifier and said phases of said generator, (ac) said power rectifiers supplying direct current to said controlled rectifier and said field winding, and supplying D.C. voltages to said Zener diode and to the collector-emitter circuits of said transistors, (ad) normally-closed contacts that initially shunt said controlled rectifier to permit current to flow through said field winding even though the output voltage of said generator is low, and (ae) a coil that opens said contacts and keeps said contacts open when the voltage generated by said generator exceeds a predetermined value.

2. A combination exciter-regulator for an alternating current generator, which has a stator winding and a rotatable field winding, that comprises:

(a) a controlled rectifier in the excitation circuit of said field winding of said generator, (b) a sub-circuit that can vary the "on" time of said controlled rectifier and thereby vary the excitation of said generator, (c) a second sub-circuit that is responsive to the voltage generated by said generator and that responds to some incipient increases in said voltage to develop an increased voltage drop across a portion thereof to cause the first said sub-circuit to decrease the "on" time of said controlled rectifier and thereby hold the output voltage of said generator at substantially the desired level and that responds to some incipient decreases in said voltage to develop a decreased voltage drop across said portion thereof to cause the first said sub-circuit to increase the "on" time of said controlled rectifier and thereby hold the output voltage of said generator at substantially the desired level, (d) said second sub-circuit having another portion thereof responsive to the frequency of the voltage generated by said generator, and hence to the speed of the rotor of said generator, (e) said other portion of said second sub-circuit responding to a change in frequency of the voltage generated by said generator to change its effective impedance and hence the overall effective impedance of said second sub-circuit, (f) the effective impedance of said other portion of said second sub-circuit responding to a change in frequency of the voltage generated by said generator at about the same rate at which said voltage responds to a change in said frequency, so the current flowing through the first said portion of said second sub-circuit will be substantially unaffected by changes in the frequency of the voltage generated by said generator, and hence in the speed of the rotor of said generator, (g) whereby said second sub-circuit can respond to those incipient changes in the voltage generated by said generator which are not due to changes in frequency to develop a change in the voltage drop across the first said portion thereof and cause the first said sub-circuit to change the "on" time of said controlled rectifier and thereby hold the output voltage of said generator at substantially the desired level, and (h) whereby said second sub-circuit permits changes in frequency to substantially change the output voltage of said generator, (i) the first said portion of said second sub-circuit being resistive, (j) said other portion of said second sub-circuit being inductive, (k) said other portion of said second sub-circuit having an effective impedance that is much greater than the effective impedance of the first said portion of said second sub-circuit, (l) whereby the impedance of said second sub-circuit is essentially inductive in nature.

3. A combination exciter-regulator for an alternating current generator, which has a stator winding and a rotatable field winding, that comprises:

(a) a controlled rectifier in the excitation circuit of said field winding of said generator, (b) a sub-circuit that can vary the "on" time of said controlled rectifier and thereby vary the excitation of said generator, (c) a second sub-circuit that is responsive to the voltage generated by said generator and that responds to some incipient increases in said voltage to develop an increased voltage drop across a portion thereof to cause the first said sub-circuit to decrease the "on" time of said controlled rectifier and thereby hold the output voltage of said generator at substantially the desired level and that responds to some incipient decreases in said voltage to develop a decreased voltage drop across said portion thereof to cause the first said sub-circuit to increase the "on" time of said controlled rectifier and thereby hold the output voltage of said generator at substantially the desired level, (d) said second sub-circuit having another portion thereof responsive to the frequency of the voltage generated by said generator, and hence to the speed of the rotor of said generator, (e) said other portion of said second sub-circuit responding to a change in frequency of the voltage generated by said generator to change its effective impedance and hence the overall effective impedance of said second sub-circuit, (f) the effective impedance of said other portion of said second sub-circuit responding to a change in frequency of the voltage generated by said generator at about the same rate at which said voltage responds to a change in said frequency, so the current flowing through the first said portion of said second sub-circuit will be substantially unaffected by changes in the frequency of the voltage generated by said generator, and hence in the speed of the rotor of said generator, (g) whereby said second sub-circuit can respond to those incipient changes in the voltage generated by said generator which are not due to changes in frequency to develop a change in the voltage drop across the first said portion thereof and cause the first said sub-circuit to change the "on" time of said controlled rectifier and thereby hold the output voltage of said generator at substantially the desired level, and (h) whereby said second sub-circuit permits changes in frequency to substantially change the output voltage of said generator.

4. A combination exciter-regulator for an alternating current generator, which has a stator winding and a rotatable field winding, that comprises:

(a) a controlled rectifier in the excitation circuit of said field winding of said generator, (b) a sub-circuit that can vary the "on" time of said controlled rectifier and thereby vary the excitation of said generator, (c) a second sub-circuit that is responsive to the voltage generated by said generator and that responds to some incipient increases in said voltage to develop an increased voltage drop across a portion thereof to cause the first said sub-circuit to decrease the "on" time of said controlled rectifier and thereby hold the output voltage of said generator at substantially the desired level and that responds to some incipient decreases in said voltage to develop a decreased voltage drop across said portion thereof to cause the first said sub-circuit to increase the "on" time of said controlled rectifier and thereby hold the output voltage of said generator at substantially the desired level.

(d) said second sub-circuit having another portion thereof responsive to the frequency of the voltage generated by said generator, and hence to the speed of the rotor of said generator, (e) whereby said second sub-circuit can respond to those incipient changes in the voltage generated by said generator which are not due to changes in frequency to develop a change in the voltage drop across the first said portion thereof and cause the first said sub-circuit to change the "on" time of said controlled rectifier and thereby hold the output voltage of said generator at substantially the desired level, and (f) whereby said second sub-circuit permits changes in frequency to substantially change the output voltage of said generator.

5. A control system for an alternating current generator, which has a stator winding and a field winding, that comprises:

(a) a variable impedance in the excitation circuit of said field winding of said generator, (b) a sub-circuit that can very the impedance of said variable impedance, and thereby vary the excitation of said generator, and (c) a second sub-circuit that is responsive to the voltage generated by said generator and that responds to some incipient increases in said voltage to develop an increased voltage drop across a portion thereof to cause the first said sub-circuit to vary the impedance of said variable impedance and thereby hold the output voltage of said generator at substantially the desired level and that responds to incipient decreases in said voltage to develop a decreased voltage drop across said portion thereof to cause the first said sub-circuit to vary the impedance of said variable impedance and thereby hold the output voltage of said generator at substantially the desired level, (d) said second sub-circuit having another portion thereof responsive to the frequency of the voltage generated by said generator and thus to the speed of the generator rotor, (e) the impedance of said other portion of said second sub-circuit responding to a change in frequency of the voltage generated by said generator while said voltage responds to a change in said frequency, so the current flowing through the first said portion of said second sub-circuit will be substantially unaffected by changes in the speed of the rotor of said generator, and hence in the frequency of the voltage generated by said generator.

6. A combination exciter-regulator for an alternating current generator, which has a stator winding and a rotatable field winding, that comprises:

(a) a controlled rectifier in the excitation circuit of said field winding of said generator, (b) a sub-circuit that can vary the "on" time of said controlled rectifier and thereby vary the excitation of said generator, (c) a second sub-circuit that is responsive to the voltage generated by said generator and that responds to some incipient increases in said voltage to develop an increased voltage drop across a portion thereof to cause the first said sub-circuit to decrease the "on" time of said controlled rectifier and thereby hold the output voltage of said generator at substantially the desired level and that responds to some incipient decreases in said voltage to develop a decreased voltage drop across said portion thereof to cause the first said sub-circuit to increase the "on" time of said controlled rectifier and thereby hold the output voltage of said generator at substantially the desired level, and (d) a third sub-circuit that can respond to increases in the current drawn from said generator to cause the first said sub-circuit to reduce the "on" time of said controlled rectifier and thereby maintain the output voltage of said generator at substantially the desired level and that can respond to decreases in the current drawn from said generator to cause the first said sub-circuit to increase the "on" time of said controlled rectifier and thereby maintain the output voltage of said generator at substantially the desired level, (e) said second sub-circuit and said third sub-circuit being interconnected to each other and to the first said sub-circuit to enable either or both said second sub-circuit and said third sub-circuit to cause the first said sub-circuit to vary the "on" time of said controlled rectifier.

7. A control system for an alternating current generator, which has a stator winding and a field winding, that comprises:

(a) a variable impedance in the excitation circuit of said field winding of said generator, (b) a sub-circuit that can vary the impedance of said variable impedance and thereby vary the excitation of said generator, (c) a second sub-circuit that is responsive to the voltage generated by said generator and that responds to some incipient increases in said voltage to develop an increased voltage drop across a portion thereof to cause the first said sub-circuit to vary the impedance of said variable impedance and thereby hold the output voltage of said generator at substantially the desired level and that responds to incipient decreases in said voltage to develop a decreased voltage drop across said portion thereof to cause the first said sub-circuit to vary the impedance of said variable impedance and thereby hold the output voltage of said generator at substantially the desired level, and (d) a third sub-circuit that can respond to increases in the current drawn from said generator to cause the first said sub-circuit to vary the impedance of said variable impedance and thereby maintain the output voltage of said generator at substantially the desired level and that can respond to decreases in the current drawn from said generator to cause the first said sub-circuit to vary the impedance of said variable impedance and thereby maintain the output voltage of said generator at substantially the desired level.

8. A combination exciter-regulator for an alternating current generator, which has a stator winding and a field winding, that comprises:

(a) a controlled rectifier in the excitation circuit of said field winding of said generator, (b) a sub-circuit that can vary the "on" time of said controlled rectifier and thereby vary the excitation of said generator, (c) a second sub-circuit that is responsive to the voltage generated by said generator and that responds to some incipient increases in said voltage to develop an increased voltage drop across a portion thereof to cause the first said sub-circuit to decrease the "on" time of said controlled rectifier and thereby hold the output voltage of said generator at substantially the desired level and that responds to some incipient decreases in said voltage to develop a decreased voltage drop across said portion thereof to cause the first said sub-circuit to increase the "on" time of said controlled rectifier and thereby hold the output voltage of said generator at substantially the desired level, (d) said generator being a polyphase generator, (e) said controlled rectifier and said field winding being connected to two phases of said generator to receive a two phase voltage, whereby said controlled rectifier can automatically become non-conductive during each cycle of said generator, (f) the first said sub-circuit including a Zener diode that can establish a predetermined voltage across a series-connected resistor and transistor, and also including a rectifier that supplies direct current to said resistor and to the base-emitter circuit of said transistor, (g) said direct current from said rectifier varying with variations in the voltage across the first said portion of said second sub-circuit to change the conductivity of said transistor, and thereby change the voltage across said resistor, (h) a second transistor, having said resistor connected between the base and emitter thereof, that controls the firing angle of said controlled rectifier, (i) said predetermined voltage across said resistor providing a predetermined conductivity for said second transistor, and thereby providing a predetermined firing angle for said controlled rectifier, (j) said second transistor responding to changes in the voltage across said resistor to change the firing angle of said controlled rectifier, (k) said second transistor providing an amplifying action so that small variations in the voltage across the first said portion of said second sub-circuit cause appreciable changes in the firing angle of said controlled rectifier, and thus cause appreciable changes in the output voltage of said generator,
(l) a second resistor connected in series with said field winding,
(m) said second resistor being connected to the first said resistor so the voltages across said resistors have the same polarities and are additive and so an increase in the voltage across said second resistor will decrease the voltage across the first said resistor and will thus cause said second transistor to increase the firing angle of said controlled rectifier,
(n) whereby said second resistor and the first said resistor provide a compounding action,
(o) a resistance-capacitance network connected to the first said transistor to keep abrupt variations in the voltage across the first said portion of said second sub-circuit and to keep abrupt changes in the current drawn from said generator from abruptly changing the conductivity of the first said transistor,
(p) whereby abrupt variations in the voltage across the first said portion of said second sub-circuits and abrupt changes in the current drawn from said generator cannot abruptly change the firing angle of said controlled rectifier,
(q) power rectifiers connected in series with said controlled rectifier and said phases of said generator,
(r) said power rectifiers supplying direct current to said controlled rectifier and said field winding, and supplying D.C. voltages to said Zener diode and to the collector-emitter circuits of said transistors,
(s) normally-closed contacts that initially shunt said controlled rectifier to permit current to flow through said field winding even though the output voltage of said generator is low, and
(t) a coil that opens said contacts and keeps said contacts open when the voltage generated by said generator exceeds a predetermined value.

9. A combination exciter-regulator for an alternating current generator, which has a stator winding and a field winding, that comprises:
(a) a controlled rectifier in the excitation circuit of said field winding of said generator,
(b) a sub-circuit that can vary the "on" time of said controlled rectifier and thereby vary the excitation of said generator,
(c) a second sub-circuit that is responsive to the voltage generated by said generator and that responds to some incipient increases in said voltage to develop an increased voltage drop across a portion thereof to cause the first said sub-circuit to decrease the "on" time of said controlled rectifier and thereby hold the output voltage of said generator at substantially the desired level and that responds to some incipient decreases in said voltage to develop a decreased voltage drop across said portion thereof to cause the first said sub-circuit to increase the "on" time of said controlled rectifier and thereby hold the output voltage of said generator at substantially the desired level,
(d) the first said sub-circuit including a Zener diode that can establish a predetermined voltage across a series-connected resistor and transistor, and also including a rectifier that supplies direct current to said resistor and to the base-emitter circuit of said transistor,
(e) said direct current from said rectifier varying with variations in the voltage across the first said portion of said second sub-circuit to change the conductivity of said transistor, and thereby change the voltage across said resistor, and
(f) a second transistor, having said resistor connected between the base and emitter thereof, that controls the firing angle of said controlled rectifier,
(g) said predetermined voltage across said resistor providing a predetermined conductivity for said second transistor, and thereby providing a predetermined firing angle for said controlled rectifier,
(h) said second transistor responding to changes in the voltage across said resistor to change the firing angle of said controlled rectifier,
(i) said second transistor providing an amplifying action so that small variations in the voltage across the first said portion of said second sub-circuit cause appreciable changes in the firing angle of said controlled rectifier, and thus cause appreciable changes in the output voltage of said generator.

10. A combination exciter-regulator for an alternating current generator, which has a stator winding and a field winding, that comprises:
(a) a controlled rectifier in the excitation circuit of said field winding of said generator,
(b) a sub-circuit that can vary the "on" time of said controlled rectifier and thereby vary the excitation of said generator,
(c) a second sub-circuit that is responsive to the voltage generated by said generator and that responds to some incipient increases in said voltage to develop an increased voltage drop across a portion thereof to cause the first said sub-circuit to decrease the "on" time of said controlled rectifier and thereby hold the output voltage of said generator at substantially the desired level and that responds to some incipient decreases in said voltage to develop a decreased voltage drop across said portion thereof to cause the first said sub-circuit to increase the "on" time of said controlled rectifier and thereby hold the output voltage of said generator at substantially the desired level,
(d) the first said sub-circuit including a Zener diode that can establish a predetermined voltage across a series-connected resistor and transistor, and also including a rectifier that supplies direct current to said resistor and to the base-emitter circuit of said transistor,
(e) said direct current from said rectifier varying with variations in the voltage across the first said portion of said second sub-circuit to change the conductivity of said transistor, and thereby change the voltage across said resistor,
(f) a second transistor, having said resistor connected between the base and emitter thereof, that controls the firing angle of said controlled rectifier,
(g) said predetermined voltage across said resistor providing a predetermined conductivity for said second transistor, and thereby providing a predetermined firing angle for said controlled rectifier,
(h) said second transistor responding to changes in the voltage across said resistor to change the firing angle of said controlled rectifier,
(i) a second resistor connected in series with said field winding,
(j) said second resistor being connected to the first said resistor so the voltages across said resistors have the same polarities and are additive and so an increase in the voltage across said second resistor will decrease the voltage across the first said resistor and will thus cause said second transistor to increase the firing angle of said controlled rectifier,
(k) whereby said second resistor and the first said resistor provide a compounding action.

11. A combination exciter-regulator for an alternating current generator, which has a stator winding and a field winding, that comprises:
(a) a controlled rectifier in the excitation circuit of said field winding of said generator,
(b) a sub-circuit that can vary the "on" time of said controlled rectifier and thereby vary the excitation of said generator,
(c) a second sub-circuit that is responsive to the voltage generated by said generator and that responds to to some incipient increases in said voltage to develop an increased voltage drop across a portion thereof to cause the first said sub-circuit to decrease the "on" time of said controlled rectifier and thereby hold the output voltage of said generator at substantially the desired level and that responds to some incipient decreases in said voltage to develop a decreased voltage drop across said portion thereof to cause the first said sub-cirucit to increase the "on" time of said controlled rectifier and thereby hold the output voltage of said generator at substantially the desired level, (d) the first said sub-circuit including a Zener diode that can establish a predetermined voltage across a series-connected resistor and transistor, and also including a rectifier that supplies direct current to said resistor and to the base-emitter circuit of said transistor, (e) said direct current from said rectifier varying with variations in the voltage across the first said portion of said second sub-circuit to change the conductivity of said transistor, and thereby change the voltage across said resistor, (f) a second transistor, having said resistor connected between the base and emitter thereof, that controls the firing angle of said controlled rectifier, (g) said predetermined voltage across said resistor providing a predetermined conductivity for said second transistor, and thereby providing a predetermined firing angle for said controlled rectifier, (h) said second transistor responding to changes in the voltage across said resistor to change the firing angle of said controlled rectifier, (i) a resistance-capacitance network connected to the first said transistor to keep abrupt variations in the voltage across the first said portion of said second sub-circuit and to keep abrupt changes in the current drawn from said generator from abruptly changing the conductivity of the first said transistor, (j) whereby abrupt variations in the voltage across the first said portion of said second sub-circuit and abrupt changes in the current drawn from said generator can not abruptly change the firing angle of said controlled rectifier.

12. A combination exciter-regulator for an alternating current generator, which has a stator winding and a field winding, that comprises:
(a) a controlled rectifier in the excitation circuit of said field winding of said generator,
(b) a sub-circuit that can vary the "on" time of said controlled rectifier and thereby vary the excitation of said generator,
(c) a variable-conductivity element in said sub-circuit that can respond to changes in voltage due to changes in the output of said generator to vary the conductivity thereof and thereby change the "on" time of said controlled rectifier, and
(d) a resistance-capacitance network connected to said variable-conductivity element,
(e) said resistance-capacitance network responding to abrupt increases in the voltage applied to said variable-conductivity element to substantially by-pass said variable-conductivity element,
(f) thereby substantially keeping said abrupt increases in the voltage applied to said variable-conductivity element from changing the conductivity of said variable-conductivity element, whereby the "on" time of said controlled rectifier is substantially unaffected by abrupt increases in the voltage applied to said variable-conductivity element,
(g) said resistance-capacitance network responding to abrupt decreases in the voltage applied to said variable-conductivity element to momentarily sustain the voltage applied to said variable-conductivity element,
(h) thereby substantially keeping said abrupt decreases in the voltage applied to said variable-conductivity element from changing the conductivity of said variable-conductivity element, whereby the "on" time of said controlled rectifier is substantially unaffected by abrupt decreases in the voltage applied to said variable-conductivity element.

13. A control system for an alternating current generator, which has a stator winding and a field winding, that comprises:
(a) a variable impedance in the excitation circuit of said field winding of said generator,
(b) a sub-circuit that can vary the impedance of said variable impedance and thereby vary the excitation of said generator,
(c) a variable-conductivity element in said sub-circuit that can respond to changes in voltage due to changes in the output of said generator to vary the conductivity thereof and thereby change the impedance of said variable impedance element, and
(d) a resistance-capacitance network connected to said variable-conductivity element,
(e) said resistance-capacitance network responding to abrupt increases in the voltage applied to said variable-conductivity element to substantially by-pass said variable-conductivity element,
(f) said resistance-capacitance network responding to abrupt decreases in the voltage applied to said variable-conductivity element to momentarily sustain the voltage applied to said variable-conductivity element.

14. A control system for an alternating current generator, which has a stator winding and a field winding, that comprises:
(a) a variable impedance in the excitation circuit of said field winding of said generator,
(b) a sub-circuit that can vary the impedance of said variable impedance and thereby vary the excitation of said generator, and
(c) a second sub-circuit that responds to some incipient increases in the output voltage of said generator to develop an increased voltage drop across a portion thereof to cause the first said sub-circuit to vary the impedance of said variable impedance and thereby hold the output voltage of said generator at substantially the desired level and that responds to incipient decreases in said voltage to develop a decreased voltage drop across said portion thereof to cause the first said sub-circuit to vary the impedance of said variable impedance and thereby hold the output voltage of said generator at substantially the desired level,
(d) said second sub-circuit responding to changes in the frequency of the voltage generated by said generator and thus to the speed of the generator rotor to change the impedance thereof,
(e) whereby the current flowing through said second sub-circuit will be substantially unaffected by changes in the speed of the rotor of said generator, and hence in the frequency of the voltage generated by said generator.

15. A control system for an alternating current generator, which has a stator winding and a field winding, that comprises:
(a) a variable impedance connected in series with said field winding to control the flow of current through said field winding,
(b) a resistor connected in series with said field winding and with said variable impedance,
(c) a sub-circuit that can vary the impedance of said variable impedance, and thereby vary the amount of current flowing through said field winding,
(d) said sub-circuit having an impedance therein which responds to current flow therethrough to develop a voltage drop thereacross which enables said sub-circuit to vary the impedance of said variable impedance,
(e) said impedance of said sub-circuit being connected to said resistor so the voltage drop across said impedance is of the same polarity as the voltage drop across said resistor and so current flowing through said impedance also flows through said resistor,
(f) said voltage drop across said resistor and the voltage drop across said impedance of said sub-circuit being additive,
(g) whereby variations in the voltage drop across said resistor will vary the voltage drop across said impedance in said sub-circuit, and thereby enable said sub-circuit to change the impedance of said variable impedance element.

16. A control system for an alternating current generator, which has a stator winding and a field winding, that comprises:
(a) a variable impedance connected in series with said field winding to control the flow of current through said field winding,
(b) a resistor connected in series with said field winding and with said variable impedance,
(c) a sub-circuit that can vary the impedance of said variable impedance, and thereby vary the amount of current flowing through said field winding,
(d) said sub-circuit having an impedance therein which responds to current flow therethrough to develop a voltage drop thereacross which enables said sub-circuit to vary the impedance of said variable impedance,
(e) said impedance of said sub-circuit being connected to said resistor so the voltage drop across said impedance is of the same polarity as the voltage drop across said resistor and so current flowing through said impedance also flows through said resistor,
(f) said voltage drop across said resistor and the voltage drop across said impedance of said sub-circuit being additive,
(g) whereby variations in the voltage drop across said resistor will vary the voltage drop across said impedance in said sub-circuit, and thereby enable said sub-circuit to change the impedance of said variable impedance element,
(h) said resistor responding to increases in the current flowing through said field winding to decrease the voltage drop across said impedance in said sub-circuit,
(i) said sub-circuit responding to decreases in the voltage drop across the said impedance thereof to increase the conductivity of said variable impedance element,
(j) whereby said resistor and said impedance in said sub-circuit coact to provide a compounding action.

17. A combination exciter-regulator for an alternating current generator, which has a stator winding and a field winding, that comprises:
(a) a controlled rectifier in the excitation circuit of said field winding of said generator,
(b) a sub-circuit that can vary the "on" time of said controlled rectifier and thereby vary the excitation of said generator,
(c) a transistor in said sub-circuit that can respond to changes in voltage due to changes in the output of said generator to vary the conductivity thereof and thereby change the "on" time of said controlled rectifier, and
(d) a resistance-capacitance network connected to said transistor with the resistor thereof connected to the base of said transistor and with the capacitor thereof connected in parallel with the collector-emitter circuit of said transistor,
(e) said resistance-capacitance network responding to abrupt increases in the voltage applied to said transistor to substantially by-pass said transistor,
(f) thereby substantially keeping said abrupt increases in the voltage applied to said transistor from changing the conductivity of said transistor, whereby the "on" time of said controlled rectifier is substantially unaffected by abrupt increases in the voltage applied to said transistor.

18. A combination exciter-regulator for an alternating current generator, which has a stator winding and a field winding, that comprises:
(a) a controlled rectifier in the excitation circuit of said field winding of said generator,
(b) a sub-circuit that can vary the "on" time of said controlled rectifier and thereby vary the excitation of said generator,
(c) a transistor in said sub-circuit that can respond to changes in voltage due to changes in the output of said generator to vary the conductivity thereof and thereby change the "on" time of said controlled rectifier, and
(d) a resistance-capacitance network connected to said transistor with the resistor thereof connected to the base of said transistor and with the capacitor thereof connected in parallel with the collector-emitter circuit of said transistor,
(e) said resistance-capacitance network responding to abrupt decreases in the voltage applied to said transistor to momentarily sustain the voltage applied to said transistor,
(f) thereby substantially keeping said abrupt decreases in the voltage applied to said transistor from changing the conductivity of said transistor, whereby the "on" time of said controlled rectifier is substantially unaffected by abrupt decreases in the voltage applied to said transistor.

References Cited

UNITED STATES PATENTS

| | | | |
|---|---|---|---|
| 3,009,091 | 11/1961 | Hallidy | 322—28 |
| 3,032,701 | 5/1962 | Krausz | 322—73 X |
| 3,209,234 | 6/1965 | Bridgeman et al. | 322—28 |
| 3,249,846 | 5/1966 | Steinbruegge et al. | 322—28 |

MILTON O. HIRSHFIELD, *Primary Examiner.*

J. D. TRAMMELL, *Assistant Examiner.*